(12) United States Patent
Sengupta et al.

(10) Patent No.: US 11,910,458 B2
(45) Date of Patent: Feb. 20, 2024

(54) NON-TERRESTRIAL NETWORK USER EQUIPMENT BEHAVIOR IN CASE OF FAILURES IN LOCATION TRACKING

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Jun Ma, San Diego, CA (US); Peter Gaal, San Diego, CA (US); Le Liu, Fremont, CA (US); Mungal Singh Dhanda, Slough (GB); Bharat Shrestha, San Diego, CA (US); Liangping Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/220,902

(22) Filed: Apr. 1, 2021

(65) Prior Publication Data

US 2022/0322477 A1    Oct. 6, 2022

(51) Int. Cl.
*H04W 56/00* (2009.01)
*H04W 76/18* (2018.01)

(52) U.S. Cl.
CPC ......... *H04W 76/18* (2018.02); *H04W 56/001* (2013.01); *H04W 56/0035* (2013.01); *H04W 56/0045* (2013.01); *H04W 74/0833* (2013.01)

(58) Field of Classification Search
CPC .............. H04W 76/18; H04W 56/001; H04W 56/0035; H04W 56/0045; H04W 74/0833
See application file for complete search history.

(56) References Cited

U.S. PATENT DOCUMENTS

| | | | |
|---|---|---|---|
| 2007/0273502 A1* | 11/2007 | Raphael .................. | G01S 19/23 342/357.62 |
| 2009/0047913 A1* | 2/2009 | Kuru .................... | H04B 7/2693 455/76 |

(Continued)

FOREIGN PATENT DOCUMENTS

| | | | | |
|---|---|---|---|---|
| KR | 20220083611 A | * | 12/2020 | .......... H04W 56/001 |
| WO | WO-2020162806 A2 | * | 8/2020 | ............. G01S 19/14 |

OTHER PUBLICATIONS

Ericsson: "On UL Time and Frequency Synchronization Enhancements for NTN", 3GPP Draft, R1-2005502, 3GPP TSG-RAN WG1 Meeting #102-e, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020 (Aug. 7, 2020), XP051917511, 13 Pages, Retrieved from the Internet: URL: https://ftp.3gpp.org/tsg_ran/WG1_RL1/TSGR1_102-e/Docs/R1-2005502.zip R1-2005502 On UL time and frequency synchronization enhancements for NTN.docx [retrieved on Jul. 8, 2020] Section 3 Section 4 Section 5 Section 6.

(Continued)

*Primary Examiner* — Lakeram Jangbahadur
(74) *Attorney, Agent, or Firm* — Holland & Hart LLP

(57) ABSTRACT

Methods, systems, and devices for wireless communications are described. The method may include establishing a connection between the UE and a network node of a non-terrestrial network, identifying, based on a synchronization failure event and while the UE is in a connected mode in accordance with establishing the connection, that a location failure condition has occurred for the connection, and performing, at least in part in response to the location failure condition, one or more actions of a location failure recovery (Continued)

procedure to restore a synchronization associated with the connection.

27 Claims, 12 Drawing Sheets

(56) References Cited

U.S. PATENT DOCUMENTS

| | | | | |
|---|---|---|---|---|
| 2011/0263245 | A1* | 10/2011 | Ishii | H04W 56/0015 |
| | | | | 455/423 |
| 2018/0324718 | A1* | 11/2018 | Serrano | H04W 76/23 |
| 2021/0006328 | A1* | 1/2021 | Kim | H04L 1/1822 |
| 2021/0297147 | A1* | 9/2021 | Qaise | H04B 7/18547 |
| 2022/0104084 | A1* | 3/2022 | Liberg | H04W 76/28 |
| 2022/0191968 | A1* | 6/2022 | Tsuboi | H04W 36/0079 |
| 2022/0279401 | A1* | 9/2022 | Wallentin | H04W 76/30 |
| 2022/0330126 | A1* | 10/2022 | Yan | H04W 24/10 |

OTHER PUBLICATIONS

Ericsson: "On UL Time and Frequency Synchronization Enhancements for NTN", 3GPP Draft, R1-2100927, 3GPP TSG-RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971266, 22 Pages, Retrieved from the Internet: URL:https://ftp.3gpp.org/tsg_ran/WG1_RL1/TSGR1_104-e/Docs/R1-2100927.zip R1-2100927 On UL time and frequency synchronization enhancements for NTN. docx [retrieved on Jan. 19, 2021] Section 3.1 Section 2.2.

Moderator (THALES): "FL Summary on Enhancements on UL Time and Frequency Synchronization for NR", 3GPP Draft, R1-2009485, 3GPP TSG-RAN WG1 Meeting #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Nov. 3, 2020 (Nov. 3, 2020), XP051950306, 43 Pages, Retrieved from the Internet: URL:https://ftp.3gpp.org/tsg_ran/WG1_RL1/TSGR1_103-e/Docs/R1-2009485.zip R1-2009485.docx [retrieved on Nov. 3, 2020] pp. 29, 30: Solution #4-2.

Partial International Search Report—PCT/US2022/021023—ISA/EPO—dated Jul. 4, 2022.

International Search Report and Written Opinion—PCT/US2022/021023—ISA/EPO—dated Aug. 25, 2022.

* cited by examiner

NON-TERRESTRIAL NETWORK USER EQUIPMENT BEHAVIOR IN CASE OF FAILURES IN LOCATION TRACKING

FIELD OF TECHNOLOGY

The following relates to wireless communications, including non-terrestrial network user equipment behavior in case of failures in location tracking.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a serving node of the UE, such as when one or more of a gateway, base station, or the UE are at a high altitude relative to one another (e.g., in a non-terrestrial network (NTN) or system with high altitude platform stations (HAPSs)). Because of the relatively large distance between wireless nodes in such cases, signal strength for communications may be relatively low, and there may be a relatively long round-trip delay or propagation delay in message transmissions (e.g., relative to terrestrial networks). Further, communications in such situations may experience relatively large amounts of Doppler shift due to relatively fast movement of nodes relative to one another. In some cases, a UE may perform a synchronization procedure to synchronize communications with an NTN device. In some cases, the UE may lose the synchronization, resulting in data communication errors. Efficient techniques for managing communications to enhance efficiency and reliability may thus be desirable for such systems.

SUMMARY

The described techniques relate to improved methods, systems, devices, and apparatuses that support non-terrestrial network user equipment behavior in case of failures in location tracking. Generally, the described techniques provide for synchronization recovery in a non-terrestrial network. The described techniques provide for a user equipment (UE) communicating with a non-terrestrial network (NTN) node (e.g., a space satellite, a balloon, a dirigible, an airplane, a drone, an unmanned aerial vehicle, and/or the like). The UE communicating with the NTN node may include the UE transmitting uplink data to a satellite, or the UE receiving downlink data from the satellite, or both. In some cases, a device (e.g., the UE, the NTN node, or a base station, or any combination thereof), may determine that a location failure condition exists or has occurred. In some cases, the device may determine that the location loss condition exists or has occurred while the UE is in connected mode. In some cases, the device may determine that the location loss condition exists based on a synchronization failure event. In some cases, the location loss condition includes a synchronization associated with a connection established between the UE and a non-terrestrial network being outside of a synchronization range. In some cases, the device may perform one or more actions of a synchronization recovery procedure to restore the synchronization associated with the connection.

A method for wireless communication at a user equipment (UE) is described. The method may include establishing a connection between the UE and a network node of a non-terrestrial network, identifying, based on a synchronization failure event and while the UE is in a connected mode in accordance with establishing the connection, that a location failure condition has occurred for the connection, and performing, at least in part in response to the location failure condition, one or more actions of a location failure recovery procedure to restore a synchronization associated with the connection.

An apparatus for wireless communication at a UE is described. The apparatus may include a processor, memory coupled with the processor, and instructions stored in the memory. The instructions may be executable by the processor to cause the apparatus to establish a connection between the UE and a network node of a non-terrestrial network, identify, based on a synchronization failure event and while the UE is in a connected mode in accordance with establishing the connection, that a location failure condition has occurred for the connection, and perform, at least in part in response to the location failure condition, one or more actions of a location failure recovery procedure to restore a synchronization associated with the connection.

Another apparatus for wireless communication at a UE is described. The apparatus may include means for establishing a connection between the UE and a network node of a non-terrestrial network, means for identifying, based on a synchronization failure event and while the UE is in a connected mode in accordance with establishing the connection, that a location failure condition has occurred for the connection, and means for performing, at least in part in response to the location failure condition, one or more actions of a location failure recovery procedure to restore a synchronization associated with the connection.

A non-transitory computer-readable medium storing code for wireless communication at a UE is described. The code may include instructions executable by a processor to establish a connection between the UE and a network node of a non-terrestrial network, identify, based on a synchronization failure event and while the UE is in a connected mode in accordance with establishing the connection, that a location failure condition has occurred for the connection, and perform, at least in part in response to the location failure condition, one or more actions of a location failure recovery procedure to restore a synchronization associated with the connection.

In some examples of the method, apparatuses, and non-transitory computer-readable medium described herein, the synchronization failure event includes expiry of a synchronization timer associated with the synchronization.

In some examples of the method, apparatuses, and non-transitory computer-readable medium described herein, a validity of an uplink frequency synchronization associated with the connection between the UE and the non-terrestrial network, or a validity of a timing advance of the UE associated with the non-terrestrial network.

Some examples of the method, apparatuses, and non-transitory computer-readable medium described herein may further include operations, features, means, or instructions for resetting the synchronization timer based on the UE receiving ephemeris information from the network node of the non-terrestrial network, or the UE acquiring the UE's location via a global navigation satellite system fix based on signals received from a set of multiple positioning satellites separate from the non-terrestrial network, or both.

Some examples of the method, apparatuses, and non-transitory computer-readable medium described herein may further include operations, features, means, or instructions for reporting the resetting of the synchronization timer to the network node.

Some examples of the method, apparatuses, and non-transitory computer-readable medium described herein may further include operations, features, means, or instructions for receiving, from the network node at least in part in response to reporting the resetting of the synchronization timer, an indication that the UE may be permitted to communicate with the non-terrestrial network based on resetting the synchronization timer.

Some examples of the method, apparatuses, and non-transitory computer-readable medium described herein may further include operations, features, means, or instructions for transmitting, to the network node, a message indicating that the synchronization timer may have expired.

In some examples of the method, apparatuses, and non-transitory computer-readable medium described herein, the message indicating the synchronization timer associated with the synchronization may have expired include a random access preamble transmission, a scheduling request, a message using a configured grant associated with the connection, a message using semi-persistent scheduling resources associated with the connection, or any combination thereof.

In some examples of the method, apparatuses, and non-transitory computer-readable medium described herein, expiration of the synchronization timer includes expiry of a global navigation satellite system fix associated with the connection, expiry of ephemeris information associated with the connection, expiry of a time synchronization associated with the connection, expiry of a frequency synchronization associated with the connection, or any combination thereof.

Some examples of the method, apparatuses, and non-transitory computer-readable medium described herein may further include operations, features, means, or instructions for initiating a radio link failure timer in accordance with performing the location failure recovery procedure, where the initiation of the radio link failure timer may be based on the synchronization timer expiry, and where the UE declares a radio link failure when the location failure recovery procedure may be not completed before the radio link failure timer expires.

Some examples of the method, apparatuses, and non-transitory computer-readable medium described herein may further include operations, features, means, or instructions for transmitting an indication of the radio link failure to the network node upon initiating the radio link failure based on the radio link failure timer being set to zero.

Some examples of the method, apparatuses, and non-transitory computer-readable medium described herein may further include operations, features, means, or instructions for determining, before expiry of the radio link failure timer, that the synchronization associated with the connection may be restored or maintained based on a synchronization recovery event associated with the radio link failure indicating that the synchronization associated with the connection may be within a synchronization range and transmitting, to the network node based on the determining that the synchronization associated with the connection may be restored or maintained, a message indicating that the synchronization may be restored.

In some examples of the method, apparatuses, and non-transitory computer-readable medium described herein, the synchronization recovery event may include operations, features, means, or instructions for determining that the synchronization timer may be active, where the synchronization timer being active indicates that the synchronization in time, in frequency, or both, may be valid, indicates a global navigation satellite system fix associated with determining the location of the UE may be valid, indicates ephemeris information associated with the connection may be valid, or any combination thereof.

In some examples of the method, apparatuses, and non-transitory computer-readable medium described herein, the synchronization timer or aspects of the synchronization timer, or both, may be configured by an indication from the non-terrestrial network or configured by the UE, or both, and the aspects of the synchronization timer include at least one of a duration, an initiation, a start time, an expiration time, a resetting, or any combination thereof.

In some examples of the method, apparatuses, and non-transitory computer-readable medium described herein, the location failure condition includes the UE failing to determine its own location within a first accuracy constraint, the UE failing to determine a location of the network node of the non-terrestrial network within a second accuracy constraint, or both.

Some examples of the method, apparatuses, and non-transitory computer-readable medium described herein may further include operations, features, means, or instructions for ceasing transmissions to the non-terrestrial network for a threshold time based on the UE determining that the location failure condition may have occurred, or transmitting an indication of a synchronization error to the network node and ceasing transmissions to the non-terrestrial network for the threshold time based on the UE transmitting the indication of the synchronization error.

Some examples of the method, apparatuses, and non-transitory computer-readable medium described herein may further include operations, features, means, or instructions for prioritizing reading ephemeris information over one or more other operations, or prioritizing acquiring a global navigation satellite system fix over the one or more other operations, or both, where the one or more other operations include transmitting an uplink communication to the network node of the non-terrestrial network, or receiving a downlink communication from the network node of the non-terrestrial network, or both.

Some examples of the method, apparatuses, and non-transitory computer-readable medium described herein may further include operations, features, means, or instructions for transmitting, to the network node, a random access preamble that includes at least one aspect or identifier dedicated to indicating the location failure condition associated with the non-terrestrial network, receiving a response to the random access preamble, where the response includes a closed-loop fix that indicates a degree to which the synchronization associated with the connection may be outside of a synchronization range, and adjusting the synchronization according to the closed-loop fix.

Some examples of the method, apparatuses, and non-transitory computer-readable medium described herein may further include operations, features, means, or instructions for initiating a radio link failure, declaring the radio link failure to the network node, or both, based on identifying the location failure condition.

In some examples of the method, apparatuses, and non-transitory computer-readable medium described herein, the synchronization failure event may include operations, features, means, or instructions for receiving a message from the network node that indicates the synchronization associated with the connection may be outside of a synchronization range, determining that a measurement indicates the synchronization associated with the connection may be outside of the synchronization range, determining an error in a message associated with the non-terrestrial network indicates that the synchronization associated with the connection may be outside of the synchronization range, or any combination thereof.

In some examples of the method, apparatuses, and non-transitory computer-readable medium described herein, the synchronization associated with the connection established between the UE and the non-terrestrial network includes a time synchronization associated with time-based communication between the UE and the non-terrestrial network, a frequency synchronization associated with frequency-based communication between the UE and the non-terrestrial network, or both.

In some examples of the method, apparatuses, and non-transitory computer-readable medium described herein, the UE includes a narrowband internet of things (NB-IoT) device, or an enhanced machine type communication (eMTC) device, or a combination thereof.

A method is described. The method may include transmitting, in a connected mode for a connection between the UE and a network node of a non-terrestrial network, one or more uplink messages to the network node, identifying, while the UE is in the connected mode, that a synchronization timer associated with a synchronization of the connection has expired, and determining, based on the expiration of the synchronization timer, that the synchronization of the connection fails to satisfy a synchronization threshold or an associated constraint.

An apparatus is described. The apparatus may include a processor, memory coupled with the processor, and instructions stored in the memory. The instructions may be executable by the processor to cause the apparatus to transmit, in a connected mode for a connection between the UE and a network node of a non-terrestrial network, one or more uplink messages to the network node, identify, while the UE is in the connected mode, that a synchronization timer associated with a synchronization of the connection has expired, and determine, based on the expiration of the synchronization timer, that the synchronization of the connection fails to satisfy a synchronization threshold or an associated constraint.

Another apparatus is described. The apparatus may include means for transmitting, in a connected mode for a connection between the UE and a network node of a non-terrestrial network, one or more uplink messages to the network node, means for identifying, while the UE is in the connected mode, that a synchronization timer associated with a synchronization of the connection has expired, and means for determining, based on the expiration of the synchronization timer, that the synchronization of the connection fails to satisfy a synchronization threshold or an associated constraint.

A non-transitory computer-readable medium storing code is described. The code may include instructions executable by a processor to transmit, in a connected mode for a connection between the UE and a network node of a non-terrestrial network, one or more uplink messages to the network node, identify, while the UE is in the connected mode, that a synchronization timer associated with a synchronization of the connection has expired, and determine, based on the expiration of the synchronization timer, that the synchronization of the connection fails to satisfy a synchronization threshold or an associated constraint.

Some examples of the method, apparatuses, and non-transitory computer-readable medium described herein may further include operations, features, means, or instructions for transmitting, to the network node, a message indicating the synchronization timer may have expired.

Some examples of the method, apparatuses, and non-transitory computer-readable medium described herein may further include operations, features, means, or instructions for reporting a resetting of the synchronization timer to the network node.

Some examples of the method, apparatuses, and non-transitory computer-readable medium described herein may further include operations, features, means, or instructions for receiving, from the network node at least in part in response to reporting the resetting of the synchronization timer, an indication that the UE may be allowed to communicate with the non-terrestrial network.

In some examples of the method, apparatuses, and non-transitory computer-readable medium described herein, the synchronization timer includes a media access control timer that indicates a validity of a Doppler frequency offset associated with communication between the UE and the non-terrestrial network and that indicates a validity of a timing advance of a terrestrial network.

In some examples of the method, apparatuses, and non-transitory computer-readable medium described herein, expiration of the synchronization timer includes expiry of a global navigation satellite system fix associated with the connection, expiry of ephemeris information associated with the connection, expiry of a time synchronization associated with the connection, expiry of a frequency synchronization associated with the connection, or any combination thereof.

DETAILED DESCRIPTION

Figure 1:
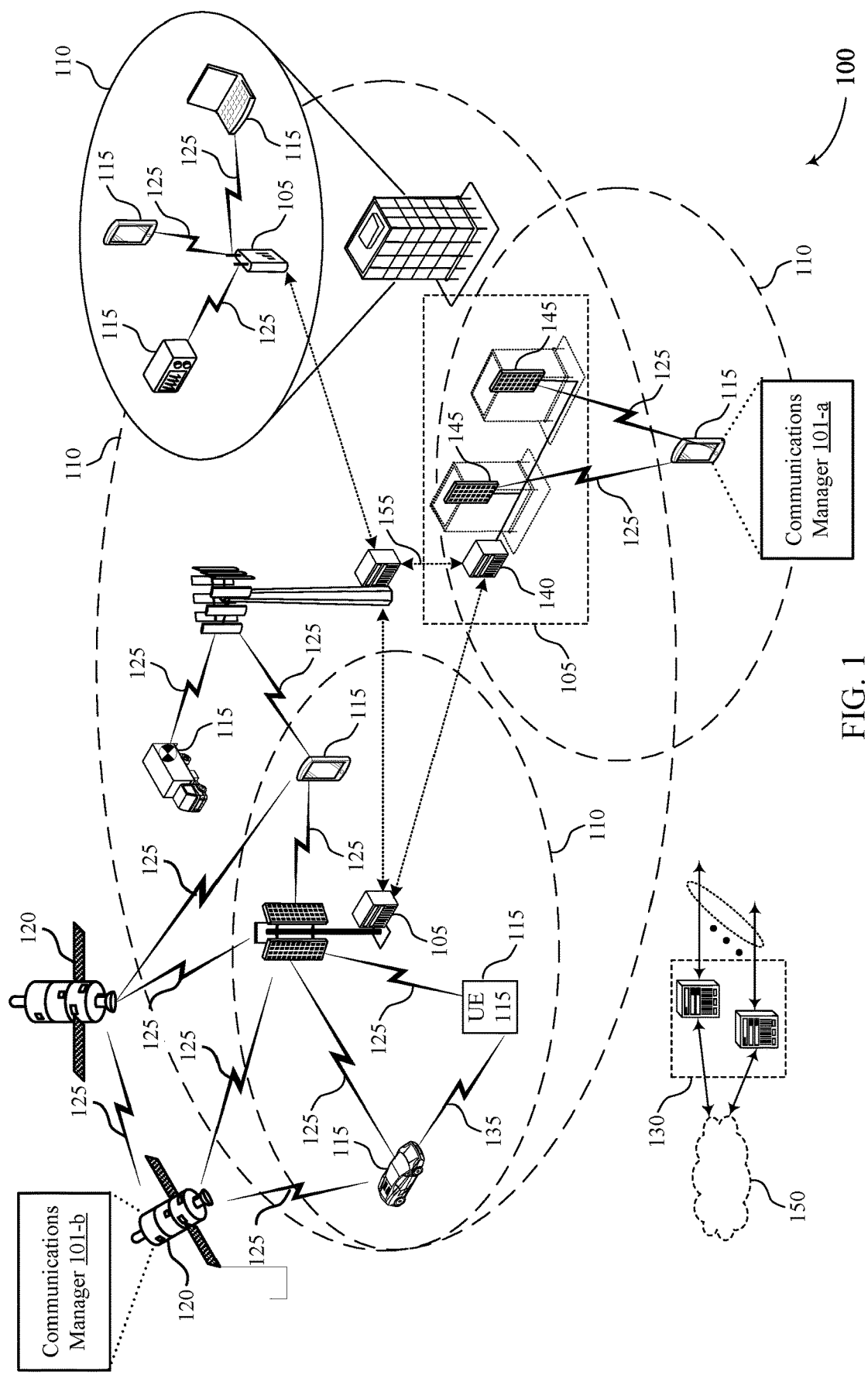
FIG. 1 illustrates an example of a wireless communications system that supports non-terrestrial network user equipment behavior in case of failures in location tracking in accordance with aspects of the present disclosure.

Non-terrestrial networks (sometimes referred to as NTNs) may provide coverage by using network nodes of the NTN (e.g., satellites, high altitude platform stations (HAPSs), high-altitude vehicles (HAVs), etc.) between user terminals and gateways or base stations (e.g., next-generation NodeBs or giga-NodeBs (which may be referred to as a gNB, and also referred to as access stations or access gateways)). Examples of NTNs include networks based on satellites, unmanned aerial vehicles, aircraft, balloons, etc. A gateway may, for example, transmit data to a satellite which may then be relayed to a user terminal or vice-versa. A high-altitude vehicle may be a base station in some examples. A user terminal may be any device capable of transmitting signals to a satellite. Examples of a user terminal may include a user equipment (UE), a relay equipment configured to relay a signal between a satellite and a user terminal, or a combination thereof. NTNs may involve the use of high altitude platform stations (HAPSs) and/or satellites to provide coverage for terrestrial base stations and UEs. The terms HAPS and satellite may be used interchangeably herein to refer to a remote NTN device that may provide coverage to one or more other high altitude or terrestrial devices. Likewise, the terms gateway and base station may be used interchangeably herein to refer to a network node that serves a UE and provides network access to the UE.

The gateway and the satellite may be thousands of kilometers apart and it may take some time for electromagnetic waves to propagate over the distance between the gateway and the satellite and between the satellite and the user terminal. Thus, the propagation delay for non-terrestrial networks may be larger than (e.g., many orders of magnitude larger than) the propagation delay for terrestrial networks. As such, the round trip delay (sometimes referred to as an RTD) associated with a signal may also be orders of magnitude larger for non-terrestrial networks than for terrestrial networks. Further, due to the high mobility of NTN network nodes such as non-geostationary satellites, communications with the non-geostationary satellites may promote large and time-varying round trip delays. Variations in round trip delay may cause user terminals to experience variation in uplink timing and frequency synchronization with NTN network nodes. As demand for communication efficiency increases, it may be desirable for wireless communications systems to support techniques for estimating and determining uplink timing that account for round trip delay as well as variation in round trip delay.

A satellite-based NTN may include one or more low earth orbit (LEO) and/or one or more medium earth orbit (MEO) satellites. With satellite-based NTNs, a satellite may be in a geostationary earth orbit or non-geostationary earth orbit, which may be low earth orbit or medium earth orbit in some example, either of which may operate based on an accurate time synchronization and frequency synchronization. The time synchronization and frequency synchronization for uplink transmissions, and the maintenance of the time synchronization and frequency synchronization (e.g., when a user equipment (UE) is in connected mode), may depend on the accuracy of a UE's global navigation satellite system (GNSS) fix (e.g., from GPS, GLONASS, etc.), or the UE's reading of up-to-date NTN serving satellite ephemeris information, or both. A UE may determine or maintain its location, or the location of a serving satellite, or both, based on the GNSS fix and ephemeris information. While a UE in idle mode may be capable of obtaining a latest, up-to-date GNSS fix and satellite ephemeris information just prior to transitioning to connected mode, obtaining this information may not always be possible when the UE is in connected mode, (e.g., when the UE is in connected mode for a relatively significant period of time, and is engaging in uplink and/or downlink data communications with the NTN serving satellite).

In some examples, a UE may not be configured for simultaneously acquiring a GNSS fix while communicating with the NTN (e.g., transmitting uplink data to an NTN device and/or receiving downlink data from the NTN device). In some cases, during relatively long connections (e.g., spanning multiple bursts), it may be impractical or prohibitive from a power consumption standpoint for the UE to read ephemeris information (e.g., via a system information block or master information block from the serving satellite) or acquiring a GNSS fix relative to a transmission (e.g., before a transmission, before each transmission, during a transmission, during each transmission, after a transmission, after each transmission, etc.). In some cases, when a UE is configured for half-duplex communications, a collision may occur between an ephemeris reading instance and a scheduled uplink transmission.

The present techniques include a UE in connected mode determining, based on one or more synchronization failure events, whether it is in or is approaching a location loss/failure condition (e.g., loss of UE location, or loss of serving satellite location, or loss of both, due to a synchronization failure), and what the UE does when it determines that it is in or is likely to be in a location loss condition.

When a synchronization timer is on or active (e.g., has not expired), then a device associated with an NTN (e.g., a UE, a base station, a satellite) may assume that the synchronization (e.g., time synchronization between the UE and another NTN device (e.g., a base station or satellite, or both), frequency synchronization between the UE the other NTN device, Doppler frequency offsets, etc.) is valid for the purposes of uplink transmission. Accordingly, an active time period of the synchronization timer indicates the synchronization of the connection is within the synchronization range. Thus, the synchronization timer being active indicates that the synchronization associated with a connection is valid, or indicates the global navigation satellite system fix associated with the connection is valid, or indicates ephemeris information associated with the connection is valid, or any combination thereof.

In some examples, a location failure condition may result from loss of time synchronization or frequency synchronization, or both, in relation to an NTN. The present techniques enable a UE in connected mode to maintain, adjust, or reestablish synchronization (e.g., time synchronization, frequency synchronization, GNSS fix, etc.) after the UE determines that a synchronization failure event has occurred.

The synchronization failure event may include the time synchronization being out of range (e.g., outside of a range constraint), the frequency synchronization being out of range, loss of GNSS fix, expiry of ephemeris information (e.g., expiry of NTN serving satellite ephemeris information), expiry of a time synchronization timer, expiry of a frequency synchronization timer, expiry of a media access control (MAC) timer, or any combination thereof. In some cases, the synchronization timer may include a frequency alignment timer that is dedicated to the non-terrestrial network and that indicates a validity of a Doppler frequency offset associated with communication between the UE and the non-terrestrial network.

The UE may take one or more actions based on the synchronization failure event. As part of the one or more actions that the UE may take, the UE may cease transmitting data on the uplink, or declare synchronization error to the network, or declare timer expiry to the network, or prioritize reading ephemeris, or prioritize acquiring GNSS fix, or transmit a random access preamble message (e.g., a random access preamble message dedicated for this purpose), or initiate a radio link failure (RLF), or declare the RLF, or any combination thereof. The UE may determine that synchronization is maintained or restored based on one or more synchronization recovery events. When the UE determines (e.g., before the RLF expires) that synchronization is maintained or restored, then the RLF process may be terminated and the UE may continue connected mode operation.

In some examples, the UE may reset a timer associated with the synchronization. In some cases, an NTN device other than the UE (e.g., network node, base station, satellite) may not schedule resources for the UE after the other NTN device determines that a location failure event has occurred, or until the UE notifies the other NTN device that the location failure event is resolved (e.g., the synchronization is maintained or restored). In some cases, an NTN device other than the UE (e.g., network node, base station, satellite) may not schedule resources for the UE after the other NTN device determines that the synchronization timer is expired, or until the UE notifies the other NTN device that the synchronization timer is reset. In some cases, the UE may indicate to the other NTN device when the UE restarted the timer or the duration of the restarted timer, or both (e.g., synchronization timer restarted at EIH:MM:SS in time zone X with a duration of 1 minute). In some cases, the other NTN device may determine that resources for the UE may be scheduled during the indicated duration (e.g., for 1 minute starting at EIH:MM:SS, where HH represents the hour, MM represents the minutes, and SS represents the seconds of the starting time).

Aspects of the subject matter described herein may be implemented to realize one or more advantages. The described techniques may support improvements in system efficiency such that a device may reduce or avoid multiple retransmissions, transmission errors, and failed transmissions. Additionally, described techniques may result in decreasing system latency, improving the reliability of NTN-related transmissions, and improving user experience.

Aspects of the disclosure are initially described in the context of wireless communications systems. Aspects of the disclosure are further illustrated by and described with reference to process flows that relate to synchronization recovery in a non-terrestrial network. Aspects of the disclosure are further illustrated by and described with reference to apparatus diagrams, system diagrams, and flowcharts that relate to non-terrestrial network user equipment behavior in case of failures in location tracking.

FIG. 1 illustrates an example of a wireless communications system 100 that supports non-terrestrial network user equipment behavior in case of failures in location tracking in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations, or both.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, network node 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more network nodes 120 of a non-terrestrial network (NTN). Network node 120 may communicate with base stations 105 (also referred to as gateways in NTNs) and UEs 115 (or other high altitude or terrestrial communications devices). Network node 120 may be any suitable type of communication satellite configured to relay communications between different end nodes in a wireless communication system. Network node 120 may be an example of a space satellite, a balloon, a dirigible, an airplane, a drone, an unmanned aerial vehicle, and the like. In some examples, the network node 120 may be in a geosynchronous or geostationary earth orbit, a low earth orbit or a medium earth orbit. A network node 120 may be a multi-beam satellite configured to provide service for multiple service beam coverage areas in a predefined geographical service area. The network node 120 may be any distance away from the surface of the earth.

In some cases, a cell may be provided or established by a network node 120 as part of an NTN. A network node 120 may, in some cases, perform the functions of a base station 105, act as a bent-pipe satellite, or may act as a regenerative satellite, or a combination thereof. In other cases, network node 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, modulating the signal to be transmitted, or a combination thereof. For example, a bent-pipe satellite (e.g., network node 120) may receive a signal from a base station 105 and may relay the signal to a UE 115 or base station 105, or vice-versa.

The UEs 115 and the base stations 105/network node 120 may support communications to enable synchronization recovery in a non-terrestrial network. In various examples, a communications manager 101 may be included in a respective device to support synchronization recovery in a non-terrestrial network. In some cases, a UE 115 may include a communications manager 101 (e.g., communications manager 101-a). Additionally, or alternatively, a base station 105 may include a communications manager 101. In some cases, an NTN device (e.g., network node 120) may include a communications manager 101 (e.g., communications manager 101-b).

In some examples, a communications manager 101 may determine that a location failure condition exists. The location failure condition may include a synchronization associated with a connection established between the UE and a non-terrestrial network being outside of a synchronization range. In some cases, communications manager 101 may determine that a location failure condition exists based on a synchronization failure event. In some cases, communications manager 101 may determine that a location failure condition exists while the UE 115 is in connected mode. In some cases, communications manager 101 may perform one or more actions of a synchronization recovery procedure to restore the synchronization associated with the connection.

Described techniques may result in the wireless communications system 100 avoiding multiple retransmissions, transmission errors, and failed transmissions. The synchronization recovery in a non-terrestrial network of wireless communications system 100 may result in decreasing system latency, improving the reliability of NTN-related transmissions, and improving user experience.

Figure 2:
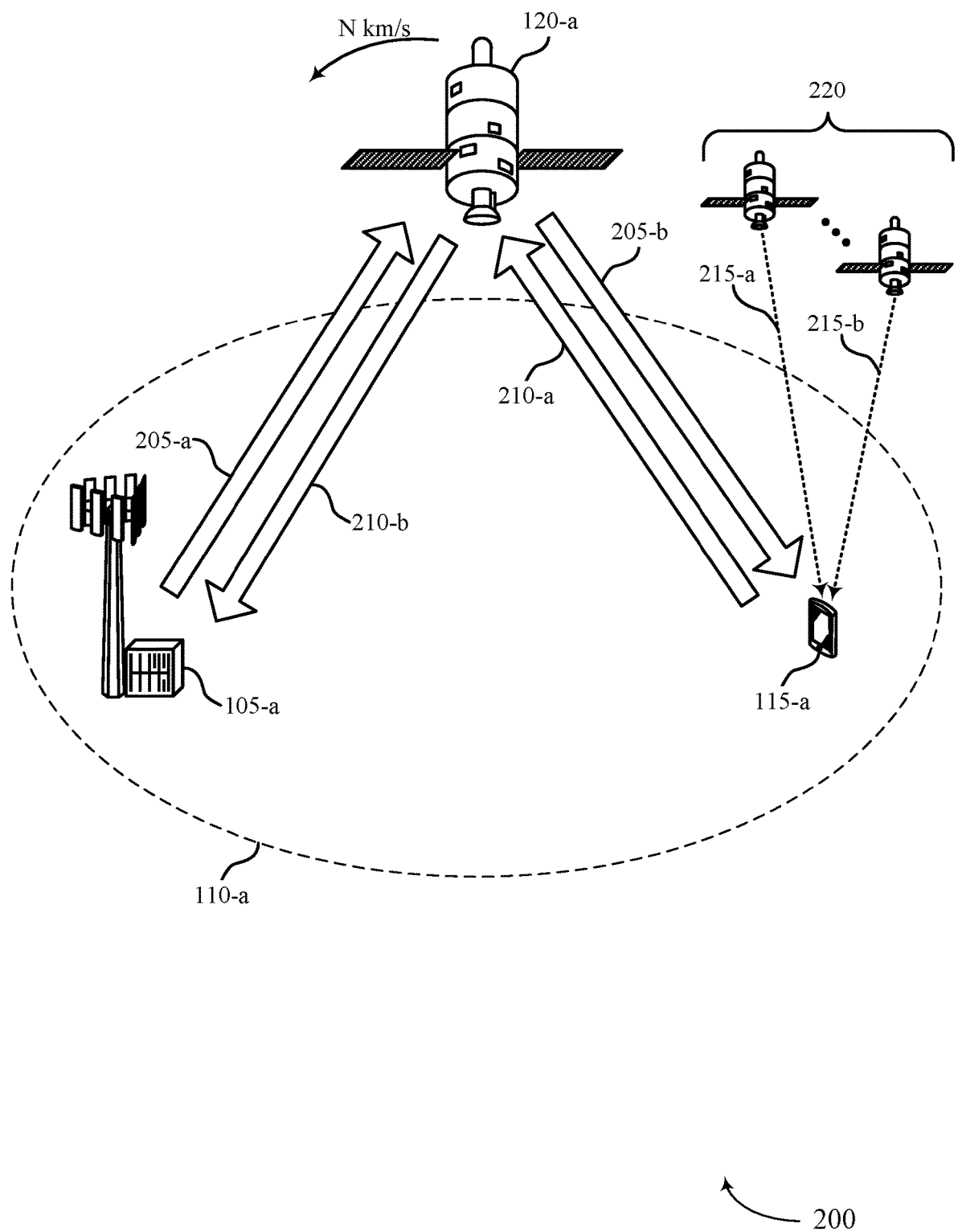
FIG. 2 illustrates an example of a wireless communications system that supports non-terrestrial network user equipment behavior in case of failures in location tracking in accordance with aspects of the present disclosure.

FIG. 2 illustrates an example of a wireless communications system 200 that supports non-terrestrial network user equipment behavior in case of failures in location tracking in accordance with aspects of the present disclosure. In some examples, wireless communications system 200 may implement aspects of wireless communications system 100. Wireless communications system 200 may include a UE 115 a, a network node 120 a, and an positioning satellite system 220, which may be examples of a base station 105, UEs 115, and network node 120 as described with reference to FIG. 1. The network node 120 a may serve a coverage area 110 a in cases of an NTN.

The wireless communications system 200 may support transmissions between the UE 115-a and the network node 120-a. For example, UE 115-a may transmit an uplink transmission 210 to the network node 120-a. Conversely, by way of another example, the network node 120-a may transmit a downlink transmission 205 to the UE 115-a. The network node 120-a may be in an orbit, such as low earth orbit, medium earth orbit, geostationary earth orbit, or other non-geostationary earth orbit. In any of these examples, the network node 120-a may be some distance from Earth (e.g., hundreds or thousands of kilometers from Earth), and therefore may be at least the same distance from the UE 115-a. Each communication (e.g., downlink transmission 205, uplink transmission 210) between the network node 120-a the UE 115-a may therefore travel from Earth the distance to the network node 120-a and back to Earth.

In some examples, UE 115-a may include an antenna configured to receive positioning signals 215 (e.g., positioning signal 215-a, positioning signal 215-b) transmitted by one or more positioning satellites of positioning satellite system 220. For example, UE 115-a may be configured to receive positioning signals 215 from a global navigation satellite system (GNSS) (e.g., GPS, GLONASS, etc.). Additionally, or alternatively, UE 115-a may be configured to receive positioning signals 215 from another system, such as an airplane positioning system, a drone positioning system, an unmanned aerial vehicle positioning system, a balloon positioning system, a dirigible positioning system, a land-based positioning system (e.g., triangulation of signals from base stations, wireless access points, etc.), a local positioning system, or a combination thereof transmitting signals that may be used to determine the position of a receiving device (e.g., UE 115-*a*).

In some examples, network node 120-*a* may provide ephemeris information to UE 115-*a*. In some cases, network node 120-*a* may provide ephemeris information to UE 115-*a* via downlink transmission 205-*b*. In some cases, network node 120-*a* may be referred to as a serving satellite or as a base station. In some cases, positioning satellite system 220 may include one or more satellites (e.g., a network of positioning satellites). In some cases, UE 115-*a* may acquire a global navigation satellite system fix via one or more positioning satellites of positioning satellite system 220. In some cases, UE 115-*a* may acquire a global navigation satellite system fix via positioning signals 215.

The network node 120-*a* may move or travel relative to fixed positions on Earth (e.g., move relative to terrestrial tracking areas). For example, when the network node 120-*a* is in a low-earth orbit, the network node 120-*a* may be between 600 km to 2000 km from Earth and travelling at a rate of N km/s, where N is a positive integer. Therefore, the network node 120-*a* and coverage area 110-*a* served by the network node 120-*a* may move relative to Earth over time. Accordingly, UE 115-*a* may be located within and served by varying cells making up the coverage area 110-*a* of the satellite over time as the network node 120-*a* moves relative to UE 115-*a*. For example, in cases where UE 115-*a* remains in a fixed location within a given terrestrial tracking area, UE 115-*a* may experience changing cell coverage as network node 120-*a*, coverage area 110-*a*, and cells of the coverage area 110-*a* move relative to UE 115-*a* over time. Accordingly, the wireless communications system 200 may be configured to support transmissions between the UE 115-*a* and the network node 120-*a* to address these issues.

In some cases, an NTN device (e.g., base station 105-*a*, or UE 115-*a*, or the network node 120-*a*, or a combination thereof), may be configured to monitor a synchronization of communications between the network node 120-*a* and the UE 115-*a*, and to determine, based on the monitoring, whether the communications between the network node 120-*a* and the UE 115-*a* remain or are likely to remain synchronized. The NTN device may determine the synchronization has been lost or is likely to be lost within some time period (e.g., based on a timer, an amount of time left on an active timer, expiration of a timer, etc.). The NTN device may be configured to restore or maintain synchronization based on performing one or more actions of a synchronization recovery procedure (e.g., synchronization maintenance procedure) to restore or maintain the synchronization associated with the connection between the UE 115-*a* and the network node 120-*a*.

In some examples, the synchronization associated with the connection between UE 115-*a* and network node 120-*a* may include a time-based synchronization of the connection, or a frequency-based synchronization of the connection, or a Doppler frequency offset of the connection, or any combination thereof.

In some examples, the synchronization associated with the connection may be based on a synchronization timer. As long as the synchronization timer is on, running, or active (e.g., not expired), then an NTN device may assume that the synchronization is valid. When the synchronization timer expires, the NTN device may determine or assume that the synchronization is invalid. In some cases, the NTN device may anticipate that the synchronization may be invalid within some time period (e.g., within X seconds when X seconds are left on the synchronization timer).

When the NTN device determines that the synchronization is invalid or likely to be invalid, the NTN device may take one or more actions to maintain or restore the synchronization. In some cases, the NTN device may cease communications associated with the connection between UE 115-*a* and network node 120-*a* (e.g., UE 115-*a* may cease uplink transmissions to network node 120-*a*, network node 120-*a* may cease downlink transmissions to UE 115-*a*, etc.). In some cases, the communications (e.g., the scheduling of resources associated with the communications) may resume when the UE 115-*a* sends a message indicating the synchronization is maintained or restored (e.g., a message indicating the synchronization timer is reset). In some cases, the NTN device may declare a synchronization error or timer expiry. In some cases, UE 115-*a* may prioritize the reading of ephemeris information or the acquiring of a global navigation satellite system fix over one or more other operations of UE 115-*a*. In some cases, UE 115-*a* may transmit a random access message based on determining that the synchronization is invalid. In some cases, another NTN device (e.g., network node 120-*a* or base station 105-*a*, or both) may transmit a closed-loop fix to UE 115-*a* based on the random access message transmitted by the UE 115-*a*. In some cases, the random access message may include an indicator (e.g., a random access identifier) that is specific to the connection between UE 115-*a* and network node 120-*a*. In some cases, the indicator may indicate that the synchronization is invalid. Accordingly, when the other NTN device receives the random access message from UE 115-*a*, the other NTN device may determine that the indicator in the random access message indicates that the synchronization is invalid. Accordingly, the other NTN device may transmit the closed-loop fix to the UE 115-*a*.

In some examples, the one or more actions may include UE 115-*a* transmitting an expiry message (e.g., synchronization error message) to another NTN device (e.g., network node 120-*a* or base station 105-*a*, or both) based on expiration of the synchronization timer. The expiry message may indicate that the synchronization timer expired. In some cases, the expiry message may indicate when the expired synchronization timer had started, what the duration of the synchronization timer was, a timestamp of when the synchronization timer expired, etc. In some cases, timer expiry message may be transmitted via a random access message, or a scheduling request, or in a message using a configured grant associated with the connection between UE 115-*a* and network node 120-*a*, or in a message using semi-persistent scheduling resources associated with the connection between UE 115-*a* and network node 120-*a*, or any combination thereof.

In some examples, the synchronization timer may include a media access control (MAC) timer (e.g., timeAlignmentTimer). In some cases, a timer that is originally configured to indicate a validity of a timing advance of a terrestrial network (e.g., a MAC timer) may be configured to indicate a validity of the synchronization associated with the connection between the UE 115-*a* and the network node 120-*a* in addition to indicating the validity of the timing advance. Additionally, or alternatively, the synchronization timer may include a timer specific to non-terrestrial networks (e.g., specific to the connection between UE 115-*a* and network node 120-*a*). In some cases, the synchronization timer may be dedicated to indicating the validity of the synchronization associated with the connection between the UE 115-*a* and the network node 120-*a* (e.g., frequencyAlignmentTimer).

In some examples, the one or more actions of the synchronization recovery procedure performed to restore or maintain the synchronization may include resetting the synchronization timer. The resetting of the synchronization timer may be performed in accordance with the UE 115-*a* acquiring a global navigation satellite system fix, or the UE 115-*a* receiving ephemeris information, or both. In some cases, UE 115-*a* may receive the ephemeris information from a serving satellite (e.g., network node 120-*a*). In some cases, UE 115-*a* may receive the ephemeris information in a system information block from network node 120-*a*. In some cases, UE 115-*a* may acquire the global navigation satellite system fix from a network of satellites (e.g., a network of satellites separate from network node 120-*a*, or a network of satellites that do not include network node 120-*a*).

In some examples, UE 115-*a* may autonomously reset the synchronization timer (e.g., reset the synchronization timer independent of a message, indication, or command from network node 120-*a* or base station 105-*a*). In some cases, when resetting the synchronization timer, UE 115-*a* may autonomously determine the on-duration of the synchronization timer (e.g., the active time duration before synchronization timer expires). In some cases, UE 115-*a* may report a synchronization message (e.g., a message indicating the synchronization is maintained or restored, a message indicated a resetting of the synchronization timer) to another NTN device (e.g., network node 120-*a* or base station 105-*a*, or both). In some cases, UE 115-*a* may indicate to the other NTN device when the synchronization timer was restarted, or the duration of the restarted synchronization timer, or both (e.g., synchronization timer restarted at HH:MM:SS in time zone X with a duration of 2 minutes). In some cases, the other NTN device may determine that resources for UE 115-*a* may be scheduled during the indicated duration (e.g., for 2 minutes from the indicated time HH:MM:SS).

In some examples, transmitting the synchronization message (e.g., a report of the resetting of the synchronization timer, a report of maintaining/restoring synchronization) may be transmitted via a random access preamble message, or a scheduling request, or in a message using a configured grant associated with the connection between UE 115-*a* and network node 120-*a*, or in a message using semi-persistent scheduling resources associated with the connection between UE 115-*a* and network node 120-*a*, or any combination thereof.

In some examples, the one or more actions may include UE 115-*a* initiating a radio link failure (RLF), or declaring an RLF to another NTN device (e.g., to network node 120-*a* or base station 105-*a*, or both), or initiating an RLF timer, or any combination thereof. In some examples, resetting the synchronization timer may be based on UE 115-*a* acquiring the global navigation satellite system fix, or the UE 115-*a* receiving the ephemeris information, or both, within some time period (e.g., a relatively recent global navigation satellite system fix acquired within a set time period, relatively recent ephemeris information received within a set time period). In some cases, the restoring or maintaining of the synchronization may be based on UE 115-*a* performing the one or more actions within a set time period (e.g., before the RLF timer expires). In some cases, the restoring or maintaining of the synchronization may be determined to be valid when UE 115-*a* performs the one or more actions within the set time period.

In some examples, a synchronization failure event (e.g., time misalignment event indicating a time synchronization failure, or a frequency misalignment event indicating a frequency synchronization failure) may trigger initiation of an RLF process. In some examples, the time synchronization failure or frequency synchronization failure may trigger the UE 115-*a* to start an RLF timer as part of the RLF process. In some cases, the RLF timer may operate similar to a T310 timer. In some cases, UE 115-*a* may set the RLF timer to 0 in relation to UE 115-*a* identifying the time synchronization failure or frequency synchronization failure. In some cases, the RLF process may include the UE 115-*a* transmitting an RLF error to network node 120-*a* (e.g., in relation to initiating the RLF timer). In some cases, the RLF timer may be configured with an NTN-specific duration (e.g., a duration specific to the time synchronization failure, or a duration specific to the frequency synchronization failure, or a duration specific to both). In some cases, the duration of the RLF timer may be determined based on a sub-event that triggers the RLF declaration process (e.g., a duration specific to expiry of ephemeris information, or a duration specific to expiry of a GNSS fix, etc.).

The synchronization failure event may indicate an error or a failure associated with synchronization of a connection between the UE 115-*a* and network node 120-*a*. In some examples, a synchronization failure event may include UE 115-*a* determining that a frequency error associated with the synchronization is outside of a range or accuracy constraint (e.g., frequency error>X ppm), or that a timing error associated with the synchronization is outside of a range or accuracy constraint (e.g., timing error>Y ppm), or both. In some cases, a synchronization failure event may include UE 115-*a* determining that a GNSS fix is lost or no longer reliable (e.g., in terms of time elapsed since last GNSS fix), or determining that ephemeris information of network node 120-*a* is lost or no longer reliable (e.g., in terms of time elapsed since last ephemeris read, e.g., from system information block or master information block, or both). In some examples, a synchronization failure event may include UE 115-*a* determining that a synchronization timer (e.g., similar to or including a media access control timer, or a time synchronization timer, or a frequency synchronization timer, or any combination thereof) has expired. When UE 115-*a* determines that a time synchronization timer associated with a time synchronization of the connection between UE 115-*a* and network node 120-*a* has expired, UE 115-*a* may determine that the time synchronization of the connection is no longer reliable. When UE 115-*a* determines that a frequency synchronization timer associated with a frequency synchronization of the connection between UE 115-*a* and network node 120-*a* has expired, UE 115-*a* may determine that the frequency synchronization of the connection is no longer reliable. In some cases, expiration of a synchronization timer may indicate that a time synchronization and a frequency synchronization of the connection are no longer reliable.

In some examples, restarting a synchronization timer may indicate synchronization is maintained or restored. In some cases, UE 115-*a* may restart a synchronization timer and transmit a message to network node 120-*a* that indicates the synchronization timer is restarted. In some cases, network node 120-*a* mays restart a synchronization timer and transmit a message to UE 115-*a* that indicates the synchronization timer is restarted. In some cases, communications between UE 115-*a* and network node 120-*a* may resume over the connection (e.g., synchronized connection, newly synchronized connection) based on the restarting of the synchronization timer or based on the notification of the restarting of the synchronization timer, or both.

In some examples, the UE 115-*a* may transmit a message to another NTN device (e.g., network node 120-*a*, base station 105-*a*) that indicates the synchronization failure event (e.g., synchronization error), or that a timer associated with the NTN has expired, or identifies the timer that has expired (e.g., time synchronization timer expired, frequency synchronization timer expired, ephemeris information timer expired, GNSS fix timer expired, etc.), or that a timer is reset (e.g., time synchronization timer reset, frequency synchronization timer reset, ephemeris information timer reset, GNSS fix timer reset, etc.), or that synchronization is maintained or restored, or any combination thereof. In some cases, the message may be transmitted via a random access message that is associated with the connection established between the UE 115-*a* and network node 120-*a* (e.g., RACH message with a particular ID indicating a synchronization failure event), or a scheduling request, or in a message using a configured grant (e.g., configured by network node 120-*a*) associated with the connection, or in a message using semi-persistent scheduling resources associated with the connection, or any combination thereof.

In some examples, coverage area 110-*a* may include one or more UEs, including UE 115-*a*. In some cases, the one or more UEs may include at least one narrowband internet of things (NB-IoT) devices. In some cases, the one or more UEs may include one or more enhanced machine-type communication (eMTC) devices.

Aspects of the subject matter described herein may be implemented to realize one or more advantages. The present techniques may reduce power consumption and free up processing cycles of one or more devices (e.g., battery-operated devices, UE 115-*a*, etc.) by reducing or avoiding multiple retransmissions, transmission errors, and failed transmissions, thus improving the one or more devices with longer battery life and improved quality of service. Additionally, described techniques may result in decreasing system latency, improving the reliability of the one or more devices and of NTN-related transmissions, while improving user experience.

Figure 3:
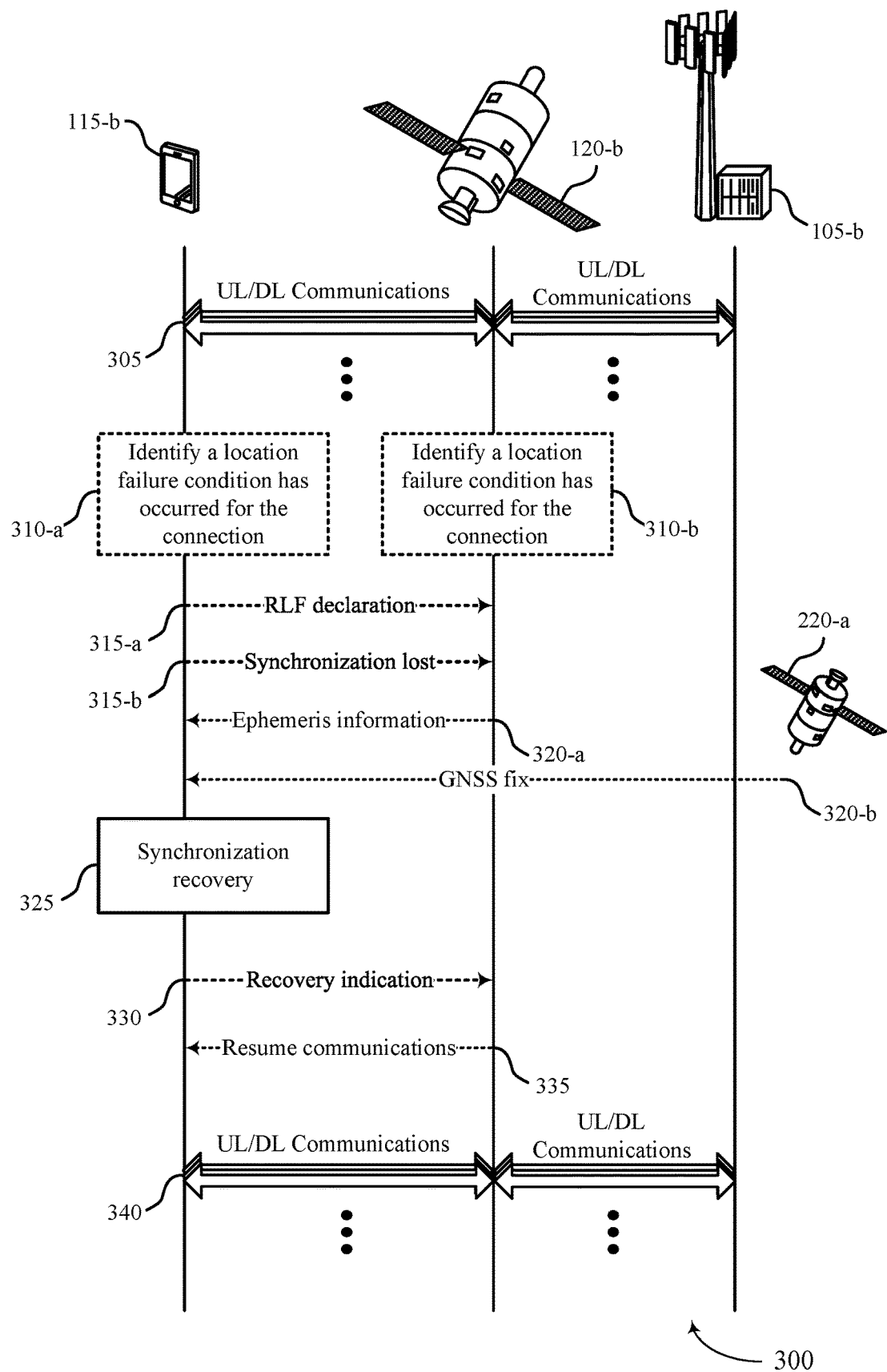
FIG. 3 illustrates an example of a process flow that supports non-terrestrial network user equipment behavior in case of failures in location tracking in accordance with aspects of the present disclosure.

FIG. 3 illustrates an example of a process flow 300 that supports non-terrestrial network user equipment behavior in case of failures in location tracking in accordance with aspects of the present disclosure.

At 305, uplink communication or downlink communication, or both, may be communicated between any combination of UE 115-*b*, a network node of a non-terrestrial network (e.g., network node 120-*b*), and base station 105-*b*. In some cases, UE 115-*b* may transmit, in a connected mode for a connection between UE 115-*b* and network node 120-*b*, one or more uplink messages to network node 120-*b*. In some cases, UE 115-*b* in the connected mode may transmit one or more uplink messages to base station 105-*b* via network node 120-*b*. In some cases, network node 120-*b* may transmit, while UE 115-*b* is in the connected mode, one or more downlink messages to UE 115-*b*. In some cases, base station 105-*b* may transmit the one or more downlink messages to UE 115-*b* via network node 120-*b* while UE 115-*b* is in the connected mode.

At 310, UE 115-*b* may optionally identify, based on a synchronization failure event and while UE 115-*b* is in the connected mode, that a location failure condition exists or has occurred for the connection. In some cases, network node 120-*b* may optionally identify, based on a synchronization failure event and while UE 115-*b* is in the connected mode, that a location failure condition exists or has occurred for the connection. In some cases, the synchronization failure event includes an expiration of a synchronization timer. In some cases, UE 115-*b* or network node 120-*b*, or both, identifying the location failure condition exists or has occurred may include UE 115-*b* or network node 120-*b*, or both, determining that a measurement indicates the synchronization associated with the connection is outside of a synchronization range, or determining that an error in a message associated with communications between UE 115-*b* and network node 120-*b* indicates that the synchronization associated with the connection is outside of a synchronization range, or any combination thereof. In some cases, UE 115-*b* may receive a message from network node 120-*b* that indicates the synchronization associated with the connection is outside of a synchronization range.

At 315-*a*, UE 115-*b* may optionally declare, to network node 120-*b*, a radio link failure (RLF). In some cases, UE 115-*b* may optionally initiate the RLF and simultaneously declare the initiated RLF to network node 120-*b* based on an associated RLF timer being set to zero.

At 315-*b*, UE 115-*b* may optionally transmit, to network node 120-*b*, a message indicating a synchronization associated with the connection has been lost. In some cases, UE 115-*b* may perform, at least in part in response to the location failure condition, one or more actions of a location failure recovery procedure to restore a synchronization associated with the connection. In some cases, the one or more actions may include UE 115-*b* transmitting the message to network node 120-*b* that indicates the synchronization associated with the connection has been lost. In some cases, UE 115-*b* may transmit a message that indicates the synchronization timer associated with the synchronization has expired, where network node 120-*b* determines the synchronization associated with the connection has been lost based on the synchronization timer having expired. In some cases, the one or more actions may include UE 115-*b* initiating a radio link failure timer in accordance with performing the location failure recovery procedure. In some cases, UE 115-*b* declares a radio link failure to network node 120-*b* when the location failure recovery procedure is not completed before the radio link failure timer expires.

At 320-*a*, network node 120-*b* may optionally transmit ephemeris information to UE 115-*b*. In some cases, network node 120-*b* may transmit ephemeris information to UE 115-*b* based on network node 120-*b* receiving the message from UE 115-*b* indicating the synchronization associated with the connection has been lost. In some cases, network node 120-*b* may transmit the ephemeris information to UE 115-*b* based on network node 120-*b* determining that the location failure condition exists or has occurred for the connection.

At 320-*b*, a positioning satellite 220-*a* may optionally transmit GNSS information to UE 115-*b*. In some cases, UE 115-*b* may acquire a GNSS fix based on the GNSS information received from positioning satellite 220-*a*.

At 325, UE 115-*b* may perform a synchronization recovery procedure (e.g., reset the synchronization timer, etc.). In some cases, UE 115-*b* may perform the synchronization recovery procedure based on UE 115-*b* receiving ephemeris information from network node 120-*b*. Additionally, or alternatively, UE 115-*b* may perform the synchronization recovery procedure based on UE 115-*b* acquiring a global navigation satellite system fix, where UE 115-*b* acquires the global navigation satellite system fix based on signals received from a plurality of positioning satellites separate from network node 120-*b*.

At 330, UE 115-*b* may optionally transmit a synchronization recovery indication (e.g., a message indicating that the synchronization timer is reset, etc.). In some cases, the synchronization recovery indication may include a message indicating the synchronization timer associated with the synchronization has expired (e.g., at 315-*b*) or the reporting of the resetting of the synchronization timer (e.g., at 330), or both. In some cases, the synchronization recovery indication may be transmitted via a random access message, a scheduling request, a message using a configured grant associated with the connection, a message using semi-persistent scheduling resources associated with the connection, or any combination thereof.

At 335, network node 120-*b* may transmit an indication to UE 115-*b* indicating UE 115-*b* is authorized to resume communications with the non-terrestrial network (e.g., with network node 120-*b*). In some cases, network node 120-*b* may transmit the indication in response to UE 115-*b* reporting the resetting of the synchronization timer to network node 120-*b*.

At 340, UE 115-*b* may resume communications with network node 120-*b*, and with base station 105-*b* via network node 120-*b*.

Figure 4:
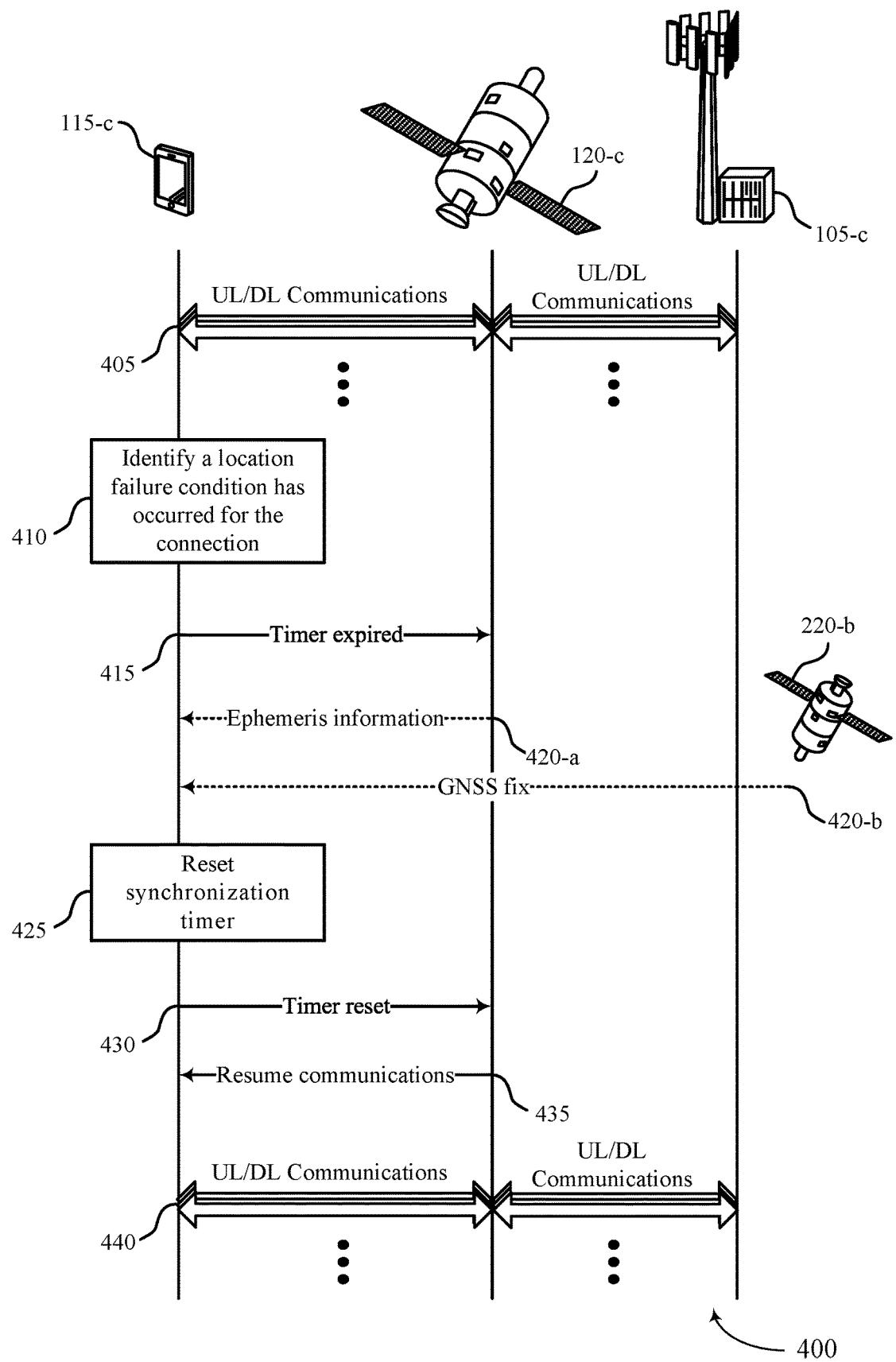
FIG. 4 illustrates an example of a process flow that supports non-terrestrial network user equipment behavior in case of failures in location tracking in accordance with aspects of the present disclosure.

FIG. 4 illustrates an example of a process flow 400 that supports non-terrestrial network user equipment behavior in case of failures in location tracking in accordance with aspects of the present disclosure.

At 405, uplink communication or downlink communication, or both, may be communicated between any combination of UE 115-*c*, a network node of a non-terrestrial network (e.g., network node 120-*c*), and base station 105-*c*. In some cases, UE 115-*c* may transmit, in a connected mode for a connection between UE 115-*c* and network node 120-*c*, one or more uplink messages to network node 120-*c*. In some cases, UE 115-*c* in the connected mode may transmit one or more uplink messages to base station 105-*c* via network node 120-*c*. In some cases, network node 120-*c* may transmit, while UE 115-*c* is in the connected mode, one or more downlink messages to UE 115-*c*. In some cases, base station 105-*c* may transmit the one or more downlink messages to UE 115-*c* via network node 120-*c* while UE 115-*c* is in the connected mode.

At 410, UE 115-*c* may identify, based on a synchronization failure event and while UE 115-*c* is in the connected mode, that a location failure condition exists or has occurred for the connection. In some cases, the synchronization failure event includes an expiration of a synchronization timer associated with a synchronization of the connection between UE 115-*c* and network node 120-*c*.

At 415, UE 115-*c* may transmit, to network node 120-*c*, a message that indicates the synchronization timer has expired. Network node 120-*c* may then determine that the synchronization associated with the connection has been lost based on the message from UE 115-*c* that the synchronization timer has expired.

At 420-*a*, network node 120-*c* may optionally transmit ephemeris information to UE 115-*c*. In some cases, network node 120-*c* may transmit ephemeris information to UE 115-*c* based on network node 120-*c* receiving the message from UE 115-*c* indicating the synchronization timer has expired.

At 420-*b*, a positioning satellite 220-*b* may optionally transmit GNSS information to UE 115-*c*. In some cases, UE 115-*c* may acquire a GNSS fix based on the GNSS information received from positioning satellite 220-*b*.

At 425, UE 115-*c* may reset the synchronization timer. In some cases, UE 115-*c* may reset the synchronization timer based on UE 115-*c* receiving the ephemeris information from network node 120-*c*.

At 430, UE 115-*c* may transmit a message indicating that the synchronization timer is reset. In some cases, the message indicating the synchronization timer associated with the synchronization has expired (e.g., at 415) or the reporting of the resetting of the synchronization timer (e.g., at 430), or both, may be transmitted by UE 115-*c* via a random access message to network node 120-*c*, a scheduling request to network node 120-*c*, a message to network node 120-*c* using a configured grant from network node 120-*c*, a message using semi-persistent scheduling resources from network node 120-*c*, or any combination thereof.

At 435, network node 120-*c* may transmit an indication to UE 115-*c* indicating UE 115-*c* is authorized to resume communications with the non-terrestrial network (e.g., with network node 120-*c*). In some cases, network node 120-*c* may transmit the indication in response to UE 115-*c* reporting the resetting of the synchronization timer to network node 120-*c*.

At 440, UE 115-*c* may resume communications with network node 120-*c*, and with base station 105-*c* via network node 120-*c*.

Figure 5:
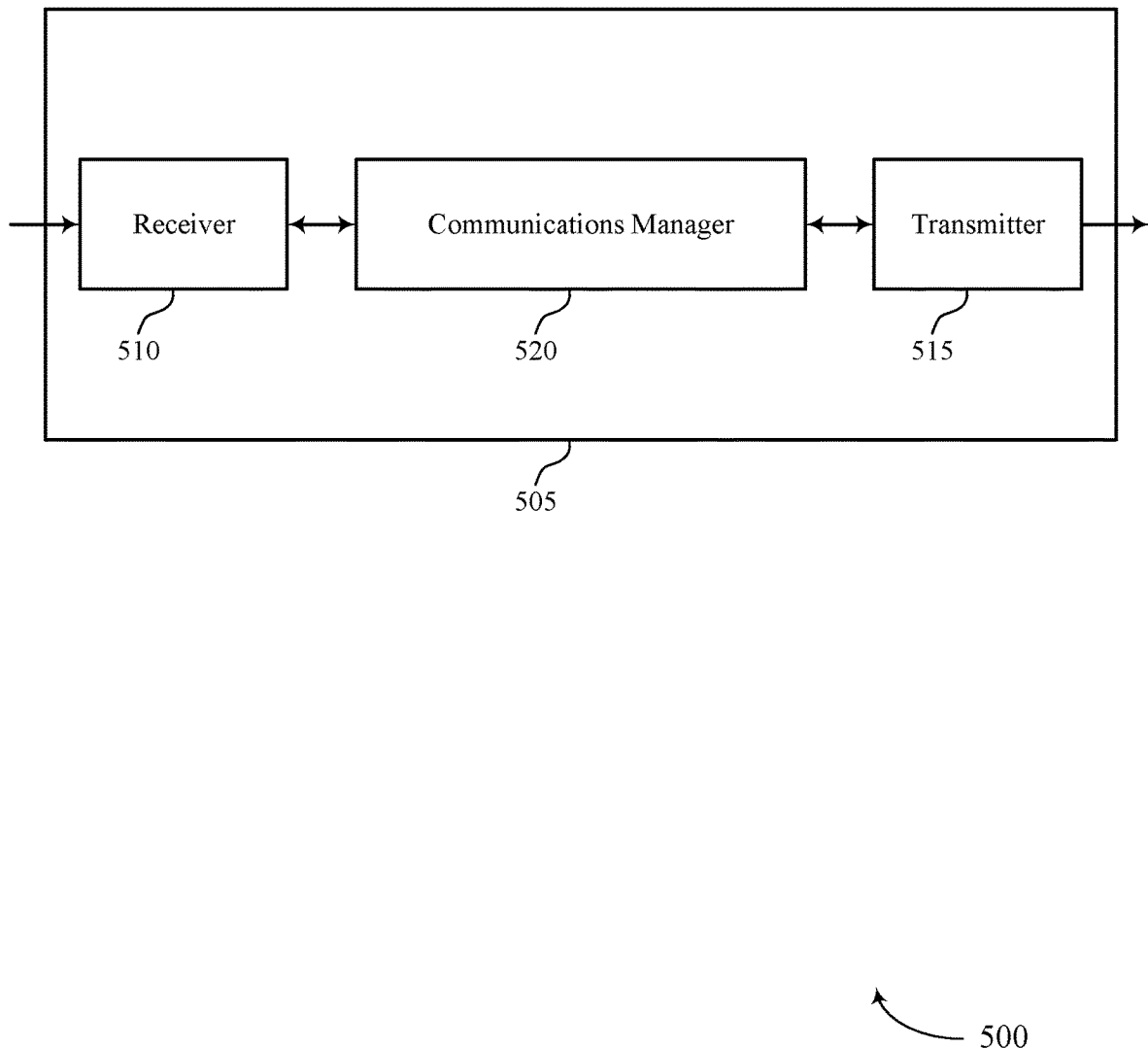
FIGS. 5 and 6 show block diagrams of devices that support non-terrestrial network user equipment behavior in case of failures in location tracking in accordance with aspects of the present disclosure.

FIG. 5 shows a block diagram 500 of a device 505 that supports non-terrestrial network user equipment behavior in case of failures in location tracking in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to non-terrestrial network user equipment behavior in case of failures in location tracking). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to non-terrestrial network user equipment behavior in case of failures in location tracking). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of non-terrestrial network user equipment behavior in case of failures in location tracking as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for establishing a connection between the UE and a network node of a non-terrestrial network. The communications manager 520 may be configured as or otherwise support a means for identifying, based on a synchronization failure event and while the UE is in a connected mode in accordance with establishing the connection, that a location failure condition has occurred for the connection. The communications manager 520 may be configured as or otherwise support a means for performing, at least in part in response to the location failure condition, one or more actions of a location failure recovery procedure to restore a synchronization associated with the connection.

For example, the communications manager 520 may be configured as or otherwise support a means for transmitting, in a connected mode for a connection between the UE and a network node of a non-terrestrial network, one or more uplink messages to the network node. The communications manager 520 may be configured as or otherwise support a means for identifying, while the UE is in the connected mode, that a synchronization timer associated with a synchronization of the connection has expired. The communications manager 520 may be configured as or otherwise support a means for determining, based on the expiration of the synchronization timer, that the synchronization of the connection fails to satisfy a synchronization threshold or an associated constraint.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for synchronization recovery in a non-terrestrial network that results in avoiding multiple retransmissions, transmission errors, and failed transmissions. The synchronization recovery may result in reduced processing, reduced power consumption, more efficient utilization of communication resources.

Figure 6:
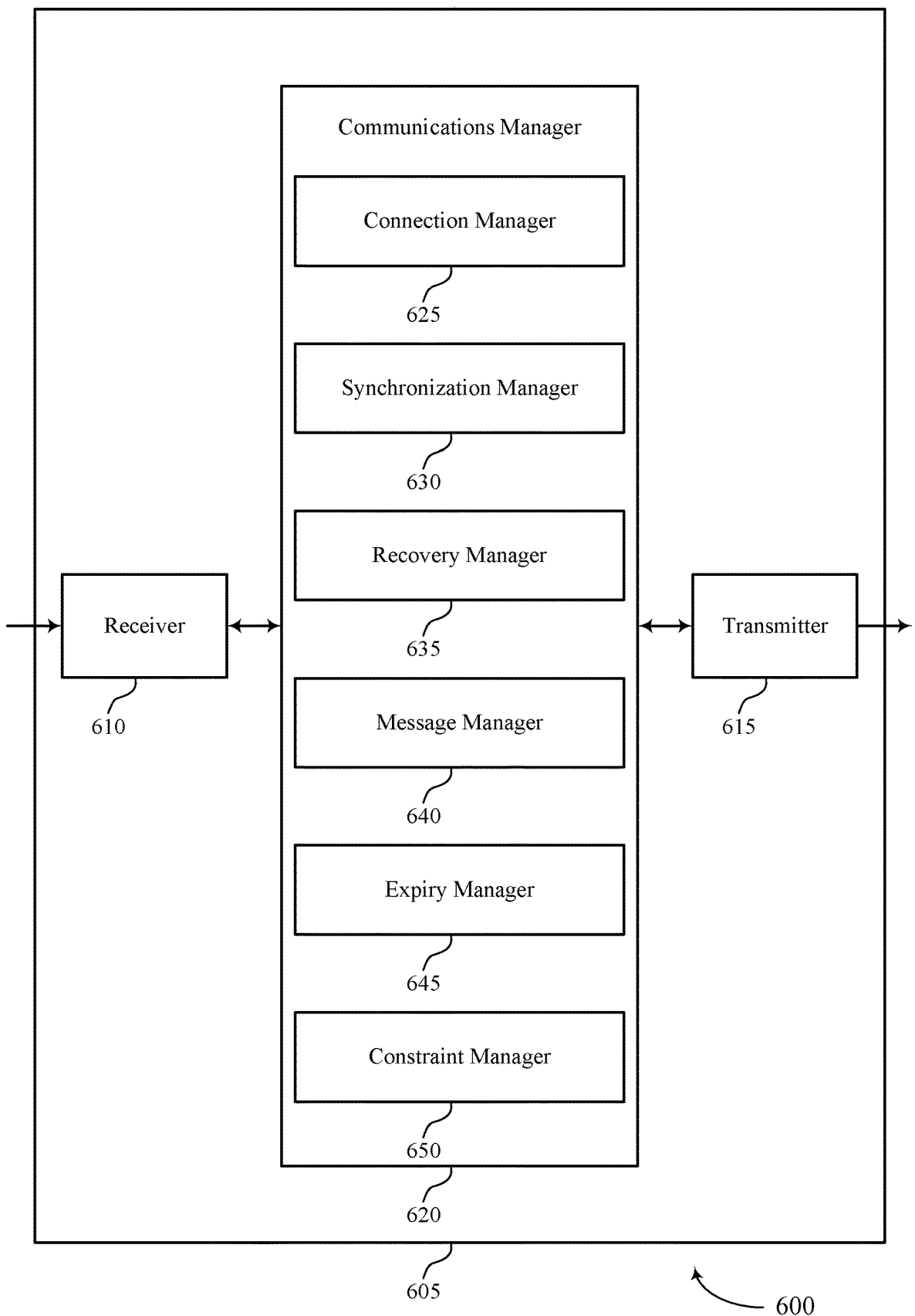

FIG. 6 shows a block diagram 600 of a device 605 that supports non-terrestrial network user equipment behavior in case of failures in location tracking in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to non-terrestrial network user equipment behavior in case of failures in location tracking). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to non-terrestrial network user equipment behavior in case of failures in location tracking). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of non-terrestrial network user equipment behavior in case of failures in location tracking as described herein. For example, the communications manager 620 may include a connection manager 625, a synchronization manager 630, a recovery manager 635, a message manager 640, an expiry manager 645, a constraint manager 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The connection manager 625 may be configured as or otherwise support a means for establishing a connection between the UE and a network node of a non-terrestrial network. The synchronization manager 630 may be configured as or otherwise support a means for identifying, based on a synchronization failure event and while the UE is in a connected mode in accordance with establishing the connection, that a location failure condition has occurred for the connection. The recovery manager 635 may be configured as or otherwise support a means for performing, at least in part in response to the location failure condition, one or more actions of a location failure recovery procedure to restore a synchronization associated with the connection.

The message manager 640 may be configured as or otherwise support a means for transmitting, in a connected mode for a connection between the UE and a network node of a non-terrestrial network, one or more uplink messages to the network node. The expiry manager 645 may be configured as or otherwise support a means for identifying, while the UE is in the connected mode, that a synchronization timer associated with a synchronization of the connection has expired. The constraint manager 650 may be configured as or otherwise support a means for determining, based on the expiration of the synchronization timer, that the synchronization of the connection fails to satisfy a synchronization threshold or an associated constraint.

Figure 7:
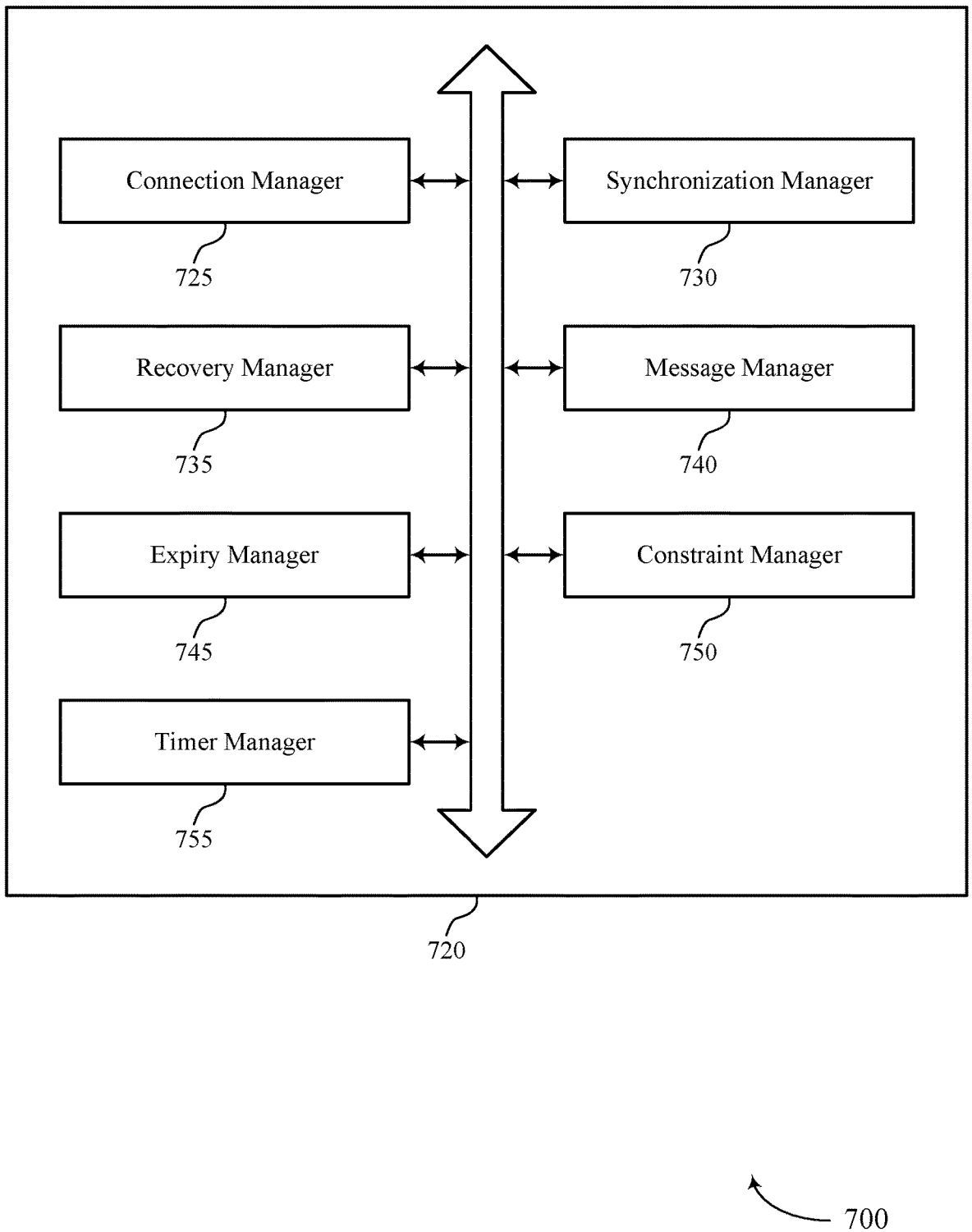
FIG. 7 shows a block diagram of a communications manager that supports non-terrestrial network user equipment behavior in case of failures in location tracking in accordance with aspects of the present disclosure.

FIG. 7 shows a block diagram 700 of a communications manager 720 that supports non-terrestrial network user equipment behavior in case of failures in location tracking in accordance with aspects of the present disclosure. The communications manager 720 may be an example of aspects of a communications manager 520, a communications manager 620, or both, as described herein. The communications manager 720, or various components thereof, may be an example of means for performing various aspects of non-terrestrial network user equipment behavior in case of failures in location tracking as described herein. For example, the communications manager 720 may include a connection manager 725, a synchronization manager 730, a recovery manager 735, a message manager 740, an expiry manager 745, a constraint manager 750, a timer manager 755, or any combination thereof. Each of these components may communicate, directly or indirectly, with one another (e.g., via one or more buses).

The communications manager 720 may support wireless communication at a UE in accordance with examples as disclosed herein. The connection manager 725 may be configured as or otherwise support a means for establishing a connection between the UE and a network node of a non-terrestrial network. The synchronization manager 730 may be configured as or otherwise support a means for identifying, based on a synchronization failure event and while the UE is in a connected mode in accordance with establishing the connection, that a location failure condition has occurred for the connection. The recovery manager 735 may be configured as or otherwise support a means for performing, at least in part in response to the location failure condition, one or more actions of a location failure recovery procedure to restore a synchronization associated with the connection.

In some examples, the synchronization failure event includes expiry of a synchronization timer associated with the synchronization.

In some examples, a validity of an uplink frequency synchronization associated with the connection between the UE and the non-terrestrial network, or a validity of a timing advance of the UE associated with the non-terrestrial network.

In some examples, the timer manager 755 may be configured as or otherwise support a means for resetting the synchronization timer based on the UE receiving ephemeris information from the network node of the non-terrestrial network, or the UE acquiring the UE's location via a global navigation satellite system fix based on signals received from a set of multiple positioning satellites separate from the non-terrestrial network, or both.

In some examples, the timer manager 755 may be configured as or otherwise support a means for reporting the resetting of the synchronization timer to the network node.

In some examples, the timer manager 755 may be configured as or otherwise support a means for receiving, from the network node at least in part in response to reporting the resetting of the synchronization timer, an indication that the UE is permitted to communicate with the non-terrestrial network based on resetting the synchronization timer.

In some examples, the recovery manager 735 may transmit, to the network node, a message indicating that the synchronization timer has expired.

In some examples, the message indicating the synchronization timer associated with the synchronization has expired include a random access preamble transmission, a scheduling request, a message using a configured grant associated with the connection, a message using semi-persistent scheduling resources associated with the connection, or any combination thereof.

In some examples, expiration of the synchronization timer includes expiry of a global navigation satellite system fix associated with the connection, expiry of ephemeris information associated with the connection, expiry of a time synchronization associated with the connection, expiry of a frequency synchronization associated with the connection, or any combination thereof.

In some examples, the timer manager 755 may be configured as or otherwise support a means for initiating a radio link failure timer in accordance with performing the location failure recovery procedure, where the initiation of the radio link failure timer is based on the synchronization timer expiry, and where the UE declares a radio link failure when the location failure recovery procedure is not completed before the radio link failure timer expires.

In some examples, the timer manager 755 may be configured as or otherwise support a means for transmitting an indication of the radio link failure to the network node upon initiating the radio link failure based on the radio link failure timer being set to zero.

In some examples, the timer manager 755 may be configured as or otherwise support a means for determining, before expiry of the radio link failure timer, that the synchronization associated with the connection is restored or maintained based on a synchronization recovery event associated with the radio link failure indicating that the synchronization associated with the connection is within a synchronization range. In some examples, the timer manager 755 may be configured as or otherwise support a means for transmitting, to the network node based on the determining that the synchronization associated with the connection is restored or maintained, a message indicating that the synchronization is restored.

In some examples, to support synchronization recovery event, the timer manager 755 may be configured as or otherwise support a means for determining that the synchronization timer is active, where the synchronization timer being active indicates that the synchronization in time, in frequency, or both, is valid, indicates a global navigation satellite system fix associated with determining the location of the UE is valid, indicates ephemeris information associated with the connection is valid, or any combination thereof.

In some examples, the synchronization timer or aspects of the synchronization timer, or both, are configured by an indication from the non-terrestrial network or configured by the UE, or both. In some examples, the aspects of the synchronization timer include at least one of a duration, an initiation, a start time, an expiration time, a resetting, or any combination thereof.

In some examples, the location failure condition includes the UE failing to determine its own location within a first accuracy constraint, the UE failing to determine a location of the network node of the non-terrestrial network within a second accuracy constraint, or both.

In some examples, the recovery manager 735 may cease transmissions to the non-terrestrial network for a threshold time based on the UE determining that the location failure condition has occurred, or transmitting an indication of a synchronization error to the network node and ceasing transmissions to the non-terrestrial network for the threshold time based on the UE transmitting the indication of the synchronization error.

In some examples, the recovery manager 735 may prioritize reading ephemeris information over one or more other operations, or prioritizing acquiring a global navigation satellite system fix over the one or more other operations, or both, where the one or more other operations include transmitting an uplink communication to the network node of the non-terrestrial network, or receiving a downlink communication from the network node of the non-terrestrial network, or both.

In some examples, the recovery manager 735 may transmit, to the network node, a random access preamble that includes at least one aspect or identifier dedicated to indicating the location failure condition associated with the non-terrestrial network. In some examples, receiving a response to the random access preamble, where the response includes a closed-loop fix that indicates a degree to which the synchronization associated with the connection is outside of a synchronization range. In some examples, adjusting the synchronization according to the closed-loop fix.

In some examples, the recovery manager 735 may initiate a radio link failure, declaring the radio link failure to the network node, or both, based on identifying the location failure condition.

In some examples, to support synchronization failure event, the synchronization manager 730 may be configured as or otherwise support a means for receiving a message from the network node that indicates the synchronization associated with the connection is outside of a synchronization range, determining that a measurement indicates the synchronization associated with the connection is outside of the synchronization range, determining an error in a message associated with the non-terrestrial network indicates that the synchronization associated with the connection is outside of the synchronization range, or any combination thereof.

In some examples, the synchronization associated with the connection established between the UE and the non-terrestrial network includes a time synchronization associated with time-based communication between the UE and the non-terrestrial network, a frequency synchronization associated with frequency-based communication between the UE and the non-terrestrial network, or both.

In some examples, the UE includes a narrowband internet of things (NB-IoT) device, or an enhanced machine type communication (eMTC) device, or a combination thereof.

The message manager 740 may be configured as or otherwise support a means for transmitting, in a connected mode for a connection between the UE and a network node of a non-terrestrial network, one or more uplink messages to the network node. The expiry manager 745 may be configured as or otherwise support a means for identifying, while the UE is in the connected mode, that a synchronization timer associated with a synchronization of the connection has expired. The constraint manager 750 may be configured as or otherwise support a means for determining, based on the expiration of the synchronization timer, that the synchronization of the connection fails to satisfy a synchronization threshold or an associated constraint.

In some examples, the expiry manager 745 may be configured as or otherwise support a means for transmitting, to the network node, a message indicating the synchronization timer has expired.

In some examples, the expiry manager 745 may be configured as or otherwise support a means for reporting a resetting of the synchronization timer to the network node.

In some examples, the expiry manager 745 may be configured as or otherwise support a means for receiving, from the network node at least in part in response to reporting the resetting of the synchronization timer, an indication that the UE is allowed to communicate with the non-terrestrial network.

In some examples, the synchronization timer includes a media access control timer that indicates a validity of a Doppler frequency offset associated with communication between the UE and the non-terrestrial network and that indicates a validity of a timing advance of a terrestrial network.

In some examples, expiration of the synchronization timer includes expiry of a global navigation satellite system fix associated with the connection, expiry of ephemeris information associated with the connection, expiry of a time synchronization associated with the connection, expiry of a frequency synchronization associated with the connection, or any combination thereof.

Figure 8:
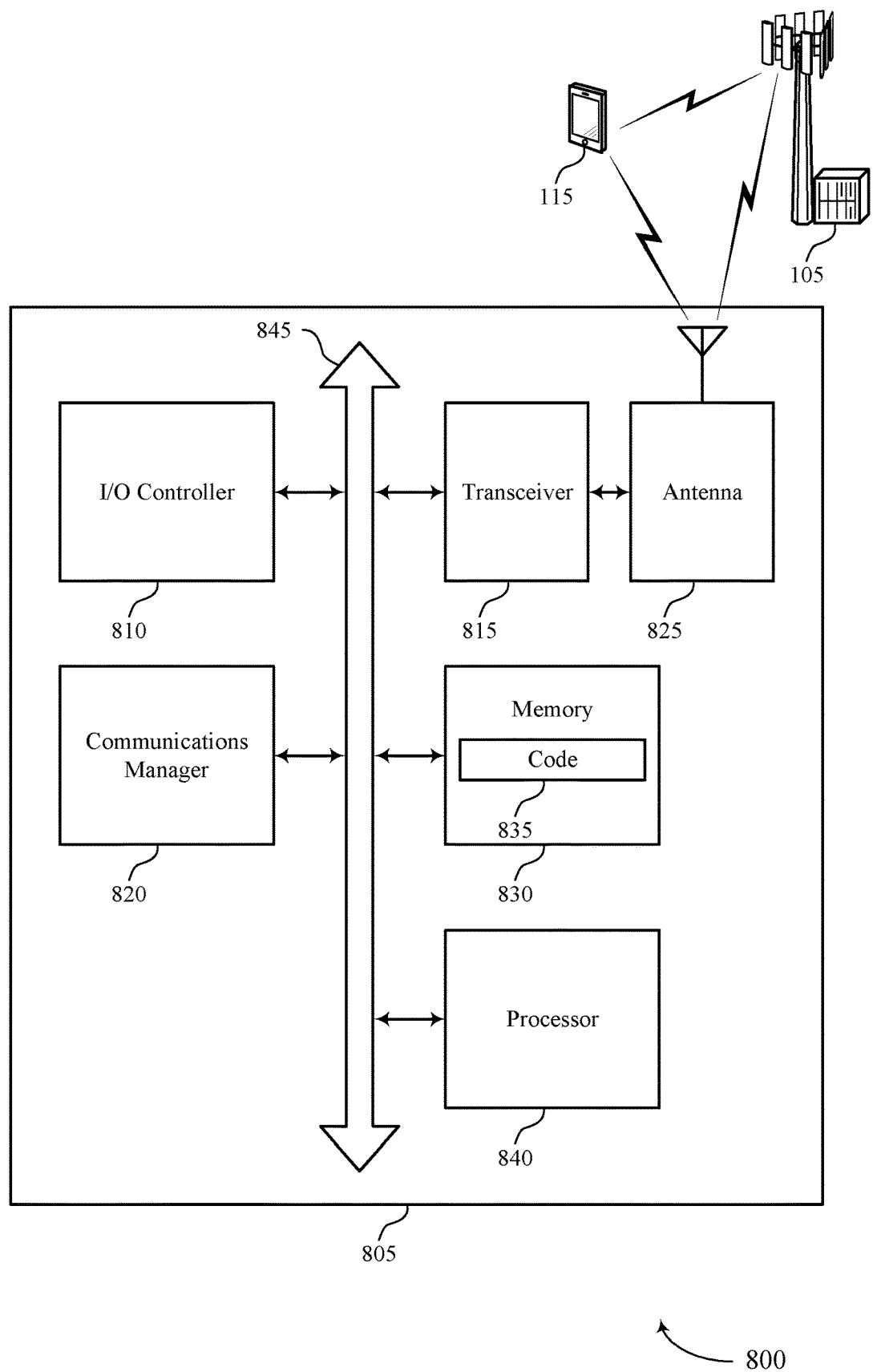
FIG. 8 shows a diagram of a system including a device that supports non-terrestrial network user equipment behavior in case of failures in location tracking in accordance with aspects of the present disclosure.

FIG. 8 shows a diagram of a system 800 including a device 805 that supports non-terrestrial network user equipment behavior in case of failures in location tracking in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting non-terrestrial network user equipment behavior in case of failures in location tracking). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for establishing a connection between the UE and a network node of a non-terrestrial network. The communications manager 820 may be configured as or otherwise support a means for identifying, based on a synchronization failure event and while the UE is in a connected mode in accordance with establishing the connection, that a location failure condition has occurred for the connection. The communications manager 820 may be configured as or otherwise support a means for performing, at least in part in response to the location failure condition, one or more actions of a location failure recovery procedure to restore a synchronization associated with the connection.

For example, the communications manager 820 may be configured as or otherwise support a means for transmitting, in a connected mode for a connection between the UE and a network node of a non-terrestrial network, one or more uplink messages to the network node. The communications manager 820 may be configured as or otherwise support a means for identifying, while the UE is in the connected mode, that a synchronization timer associated with a synchronization of the connection has expired. The communications manager 820 may be configured as or otherwise support a means for determining, based on the expiration of the synchronization timer, that the synchronization of the connection fails to satisfy a synchronization threshold or an associated constraint.

By including or configuring the communications manager 820 in accordance with examples as described herein, the device 805 may support techniques for synchronization recovery in a non-terrestrial network that results in avoiding multiple retransmissions, transmission errors, and failed transmissions. The synchronization recovery may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of non-terrestrial network user equipment behavior in case of failures in location tracking as described herein, or the processor 840 and the memory 830 may be otherwise configured to perform or support such operations.

Figure 9:
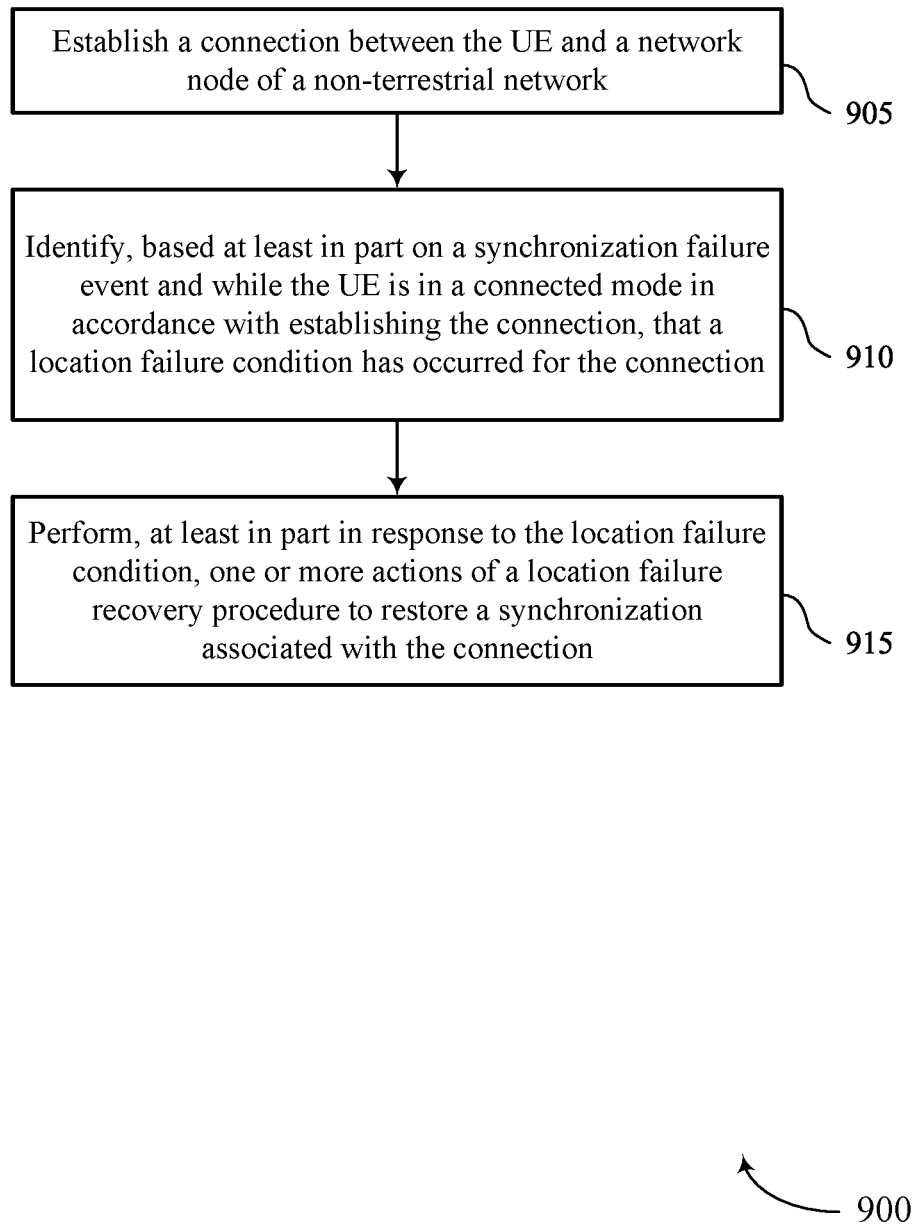
FIGS. 9 through 12 show flowcharts illustrating methods that support non-terrestrial network user equipment behavior in case of failures in location tracking in accordance with aspects of the present disclosure.

FIG. 9 shows a flowchart illustrating a method 900 that supports non-terrestrial network user equipment behavior in case of failures in location tracking in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include establishing a connection between the UE and a network node of a non-terrestrial network. The operations of 905 may be performed in accordance with examples as disclosed herein. In some examples, aspects of the operations of 905 may be performed by a connection manager 725 as described with reference to FIG. 7.

At 910, the method may include identifying, based on a synchronization failure event and while the UE is in a connected mode in accordance with establishing the connection, that a location failure condition has occurred for the connection. The operations of 910 may be performed in accordance with examples as disclosed herein. In some examples, aspects of the operations of 910 may be performed by a synchronization manager 730 as described with reference to FIG. 7.

At 915, the method may include performing, at least in part in response to the location failure condition, one or more actions of a location failure recovery procedure to restore a synchronization associated with the connection. The operations of 915 may be performed in accordance with examples as disclosed herein. In some examples, aspects of the operations of 915 may be performed by a recovery manager 735 as described with reference to FIG. 7.

Figure 10:
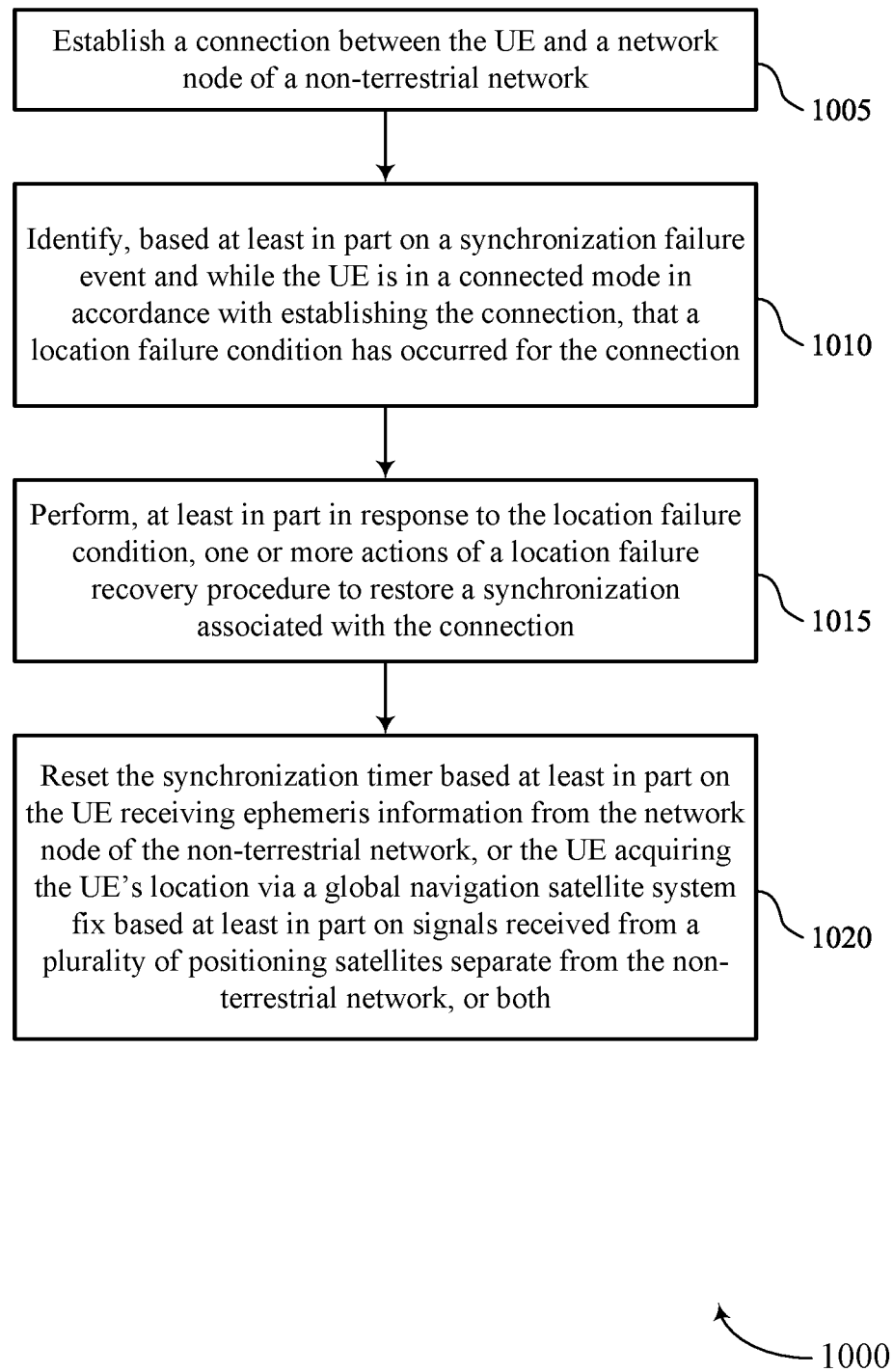

FIG. 10 shows a flowchart illustrating a method 1000 that supports non-terrestrial network user equipment behavior in case of failures in location tracking in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include establishing a connection between the UE and a network node of a non-terrestrial network. The operations of 1005 may be performed in accordance with examples as disclosed herein. In some examples, aspects of the operations of 1005 may be performed by a connection manager 725 as described with reference to FIG. 7.

At 1010, the method may include identifying, based on a synchronization failure event and while the UE is in a connected mode in accordance with establishing the connection, that a location failure condition has occurred for the connection. The operations of 1010 may be performed in accordance with examples as disclosed herein. In some examples, aspects of the operations of 1010 may be performed by a synchronization manager 730 as described with reference to FIG. 7.

At 1015, the method may include performing, at least in part in response to the location failure condition, one or more actions of a location failure recovery procedure to restore a synchronization associated with the connection. The operations of 1015 may be performed in accordance with examples as disclosed herein. In some examples, aspects of the operations of 1015 may be performed by a recovery manager 735 as described with reference to FIG. 7.

At 1020, the method may include resetting the synchronization timer based on the UE receiving ephemeris information from the network node of the non-terrestrial network, or the UE acquiring the UE's location via a global navigation satellite system fix based on signals received from a set of multiple positioning satellites separate from the non-terrestrial network, or both. The operations of 1020 may be performed in accordance with examples as disclosed herein. In some examples, aspects of the operations of 1020 may be performed by a timer manager 755 as described with reference to FIG. 7.

Figure 11:
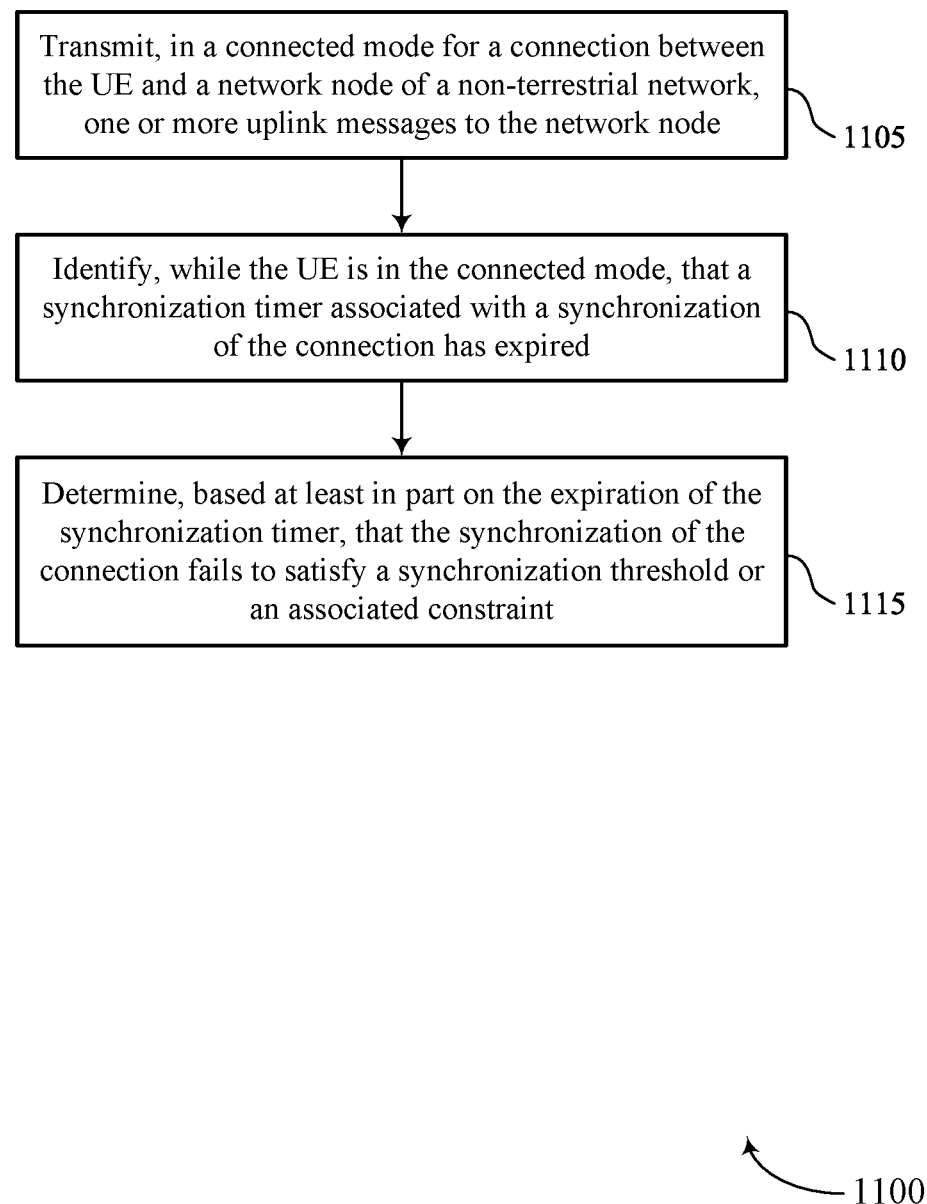

FIG. 11 shows a flowchart illustrating a method 1100 that supports non-terrestrial network user equipment behavior in case of failures in location tracking in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting, in a connected mode for a connection between the UE and a network node of a non-terrestrial network, one or more uplink messages to the network node. The operations of 1105 may be performed in accordance with examples as disclosed herein. In some examples, aspects of the operations of 1105 may be performed by a message manager 740 as described with reference to FIG. 7.

At 1110, the method may include identifying, while the UE is in the connected mode, that a synchronization timer associated with a synchronization of the connection has expired. The operations of 1110 may be performed in accordance with examples as disclosed herein. In some examples, aspects of the operations of 1110 may be performed by an expiry manager 745 as described with reference to FIG. 7.

At 1115, the method may include determining, based on the expiration of the synchronization timer, that the synchronization of the connection fails to satisfy a synchronization threshold or an associated constraint. The operations of 1115 may be performed in accordance with examples as disclosed herein. In some examples, aspects of the operations of 1115 may be performed by a constraint manager 750 as described with reference to FIG. 7.

Figure 12:
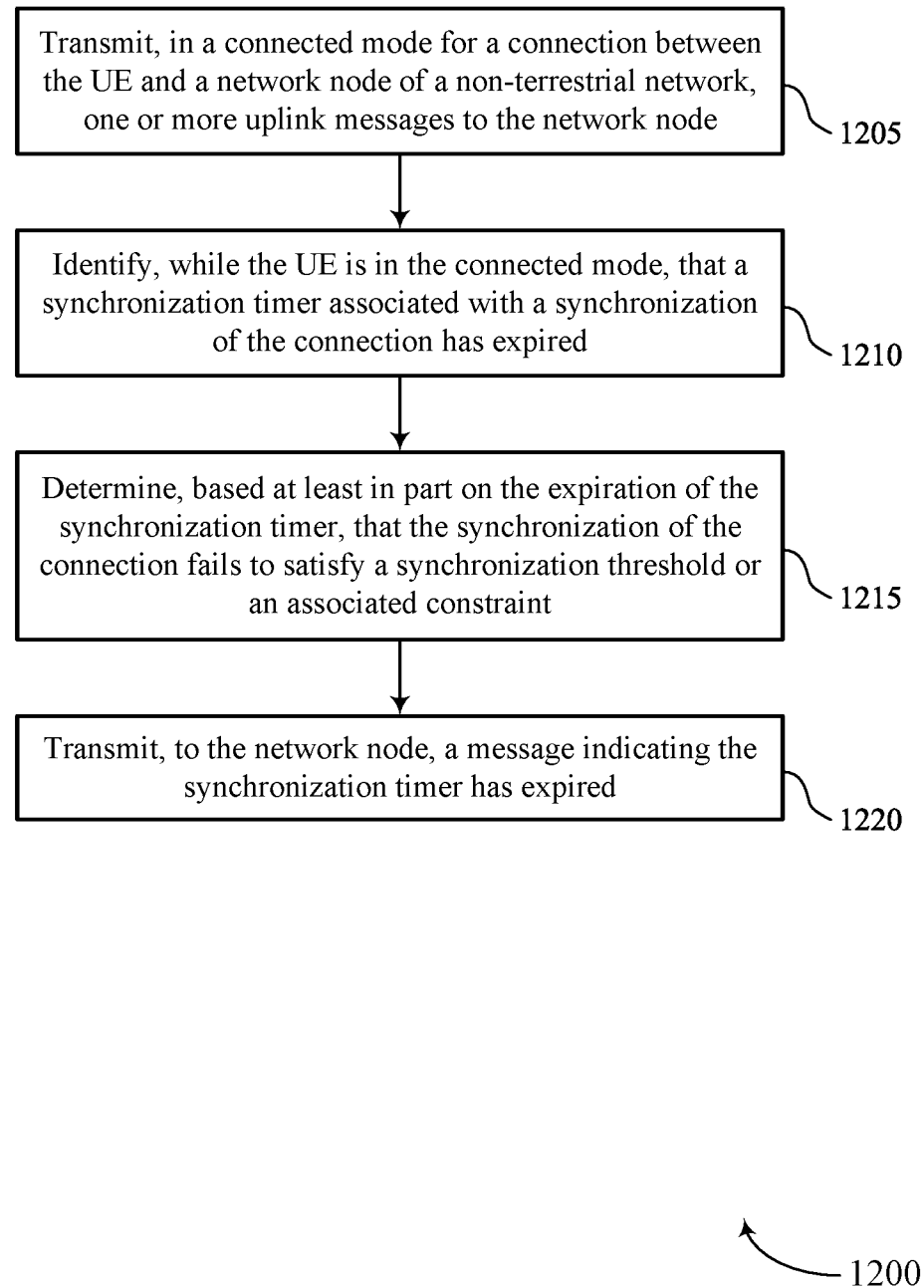

FIG. 12 shows a flowchart illustrating a method 1200 that supports non-terrestrial network user equipment behavior in case of failures in location tracking in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include transmitting, in a connected mode for a connection between the UE and a network node of a non-terrestrial network, one or more uplink messages to the network node. The operations of 1205 may be performed in accordance with examples as disclosed herein. In some examples, aspects of the operations of 1205 may be performed by a message manager 740 as described with reference to FIG. 7.

At 1210, the method may include identifying, while the UE is in the connected mode, that a synchronization timer associated with a synchronization of the connection has expired. The operations of 1210 may be performed in accordance with examples as disclosed herein. In some examples, aspects of the operations of 1210 may be performed by an expiry manager 745 as described with reference to FIG. 7.

At 1215, the method may include determining, based on the expiration of the synchronization timer, that the synchronization of the connection fails to satisfy a synchronization threshold or an associated constraint. The operations of 1215 may be performed in accordance with examples as disclosed herein. In some examples, aspects of the operations of 1215 may be performed by a constraint manager 750 as described with reference to FIG. 7.

At 1220, the method may include transmitting, to the network node, a message indicating the synchronization timer has expired. The operations of 1220 may be performed in accordance with examples as disclosed herein. In some examples, aspects of the operations of 1220 may be performed by an expiry manager 745 as described with reference to FIG. 7.

The following provides an overview of aspects of the present disclosure:

Aspect 1: A method for wireless communication at a UE, comprising: establishing a connection between the UE and a network node of a non-terrestrial network; identifying, based at least in part on a synchronization failure event and while the UE is in a connected mode in accordance with establishing the connection, that a location failure condition has occurred for the connection; and performing, at least in part in response to the location failure condition, one or more actions of a location failure recovery procedure to restore a synchronization associated with the connection.

Aspect 2: The method of aspect 1, wherein the synchronization failure event comprises expiry of a synchronization timer associated with the synchronization.

Aspect 3: The method of aspect 2, wherein the synchronization timer indicates at least one of a validity of an uplink frequency synchronization associated with the connection between the UE and the non-terrestrial network, or a validity of a timing advance of the UE associated with the non-terrestrial network.

Aspect 4: The method of any of aspects 2 through 3, further comprising: resetting the synchronization timer based at least in part on the UE receiving ephemeris information from the network node of the non-terrestrial network, or the UE acquiring the UE's location via a global navigation satellite system fix based at least in part on signals received from a plurality of positioning satellites separate from the non-terrestrial network, or both.

Aspect 5: The method of aspect 4, further comprising: reporting the resetting of the synchronization timer to the network node.

Aspect 6: The method of aspect 5, further comprising: receiving, from the network node at least in part in response to reporting the resetting of the synchronization timer, an indication that the UE is permitted to communicate with the non-terrestrial network based at least in part on resetting the synchronization timer.

Aspect 7: The method of any of aspects 2 through 6, wherein the one or more actions comprise transmitting, to the network node, a message indicating that the synchronization timer has expired.

Aspect 8: The method of aspect 7, wherein the message indicating the synchronization timer associated with the synchronization has expired comprise a random access preamble transmission, a scheduling request, a message using a configured grant associated with the connection, a message using semi-persistent scheduling resources associated with the connection, or any combination thereof.

Aspect 9: The method of any of aspects 2 through 8, wherein expiration of the synchronization timer comprises expiry of a global navigation satellite system fix associated with the connection, expiry of ephemeris information associated with the connection, expiry of a time synchronization associated with the connection, expiry of a frequency synchronization associated with the connection, or any combination thereof.

Aspect 10: The method of any of aspects 2 through 9, further comprising: initiating a radio link failure timer in accordance with performing the location failure recovery procedure, wherein the initiation of the radio link failure timer is based at least in part on the synchronization timer expiry, and wherein the UE declares a radio link failure when the location failure recovery procedure is not completed before the radio link failure timer expires.

Aspect 11: The method of aspect 10, further comprising: transmitting an indication of the radio link failure to the network node upon initiating the radio link failure based at least in part on the radio link failure timer being set to zero.

Aspect 12: The method of any of aspects 10 through 11, further comprising: determining, before expiry of the radio link failure timer, that the synchronization associated with the connection is restored or maintained based at least in part on a synchronization recovery event associated with the radio link failure indicating that the synchronization associated with the connection is within a synchronization range; and transmitting, to the network node based at least in part on the determining that the synchronization associated with the connection is restored or maintained, a message indicating that the synchronization is restored.

Aspect 13: The method of aspect 12, wherein the synchronization recovery event comprises: determining that the synchronization timer is active, wherein the synchronization timer being active indicates that the synchronization in time, in frequency, or both, is valid, indicates a global navigation satellite system fix associated with determining the location of the UE is valid, indicates ephemeris information associated with the connection is valid, or any combination thereof.

Aspect 14: The method of any of aspects 2 through 13, wherein the synchronization timer or aspects of the synchronization timer, or both, are configured by an indication from the non-terrestrial network or configured by the UE, or both, the aspects of the synchronization timer comprise at least one of a duration, an initiation, a start time, an expiration time, a resetting, or any combination thereof.

Aspect 15: The method of any of aspects 2 through 14, wherein the location failure condition comprises the UE failing to determine its own location within a first accuracy constraint, the UE failing to determine a location of the network node of the non-terrestrial network within a second accuracy constraint, or both.

Aspect 16: The method of any of aspects 1 through 15, wherein the one or more actions comprise ceasing transmissions to the non-terrestrial network for a threshold time based at least in part on the UE determining that the location failure condition has occurred, or transmitting an indication of a synchronization error to the network node and ceasing transmissions to the non-terrestrial network for the threshold time based at least in part on the UE transmitting the indication of the synchronization error.

Aspect 17: The method of any of aspects 1 through 16, wherein the one or more actions comprise prioritizing reading ephemeris information over one or more other operations, or prioritizing acquiring a global navigation satellite system fix over the one or more other operations, or both, wherein the one or more other operations comprise transmitting an uplink communication to the network node of the non-terrestrial network, or receiving a downlink communication from the network node of the non-terrestrial network, or both.

Aspect 18: The method of any of aspects 1 through 17, wherein the one or more actions comprise transmitting, to the network node, a random access preamble that comprises at least one aspect or identifier dedicated to indicating the location failure condition associated with the non-terrestrial network; receiving a response to the random access preamble, wherein the response comprises a closed-loop fix that indicates a degree to which the synchronization associated with the connection is outside of a synchronization range; and adjusting the synchronization according to the closed-loop fix.

Aspect 19: The method of any of aspects 1 through 18, wherein the one or more actions comprise initiating a radio link failure, declaring the radio link failure to the network node, or both, based at least in part on identifying the location failure condition.

Aspect 20: The method of any of aspects 1 through 19, wherein the synchronization failure event comprises: receiving a message from the network node that indicates the synchronization associated with the connection is outside of a synchronization range, determining that a measurement indicates the synchronization associated with the connection is outside of the synchronization range, determining an error in a message associated with the non-terrestrial network indicates that the synchronization associated with the connection is outside of the synchronization range, or any combination thereof.

Aspect 21: The method of any of aspects 1 through 20, wherein the synchronization associated with the connection established between the UE and the non-terrestrial network comprises a time synchronization associated with time-based communication between the UE and the non-terrestrial network, a frequency synchronization associated with frequency-based communication between the UE and the non-terrestrial network, or both.

Aspect 22: The method of any of aspects 1 through 21, wherein the UE comprises a narrowband internet of things (NB-IoT) device, or an enhanced machine type communication (eMTC) device, or a combination thereof.

Aspect 23: A method for wireless communication at a UE comprising: transmitting, in a connected mode for a connection between the UE and a network node of a non-terrestrial network, one or more uplink messages to the network node; identifying, while the UE is in the connected mode, that a synchronization timer associated with a synchronization of the connection has expired; and determining, based at least in part on the expiration of the synchronization timer, that the synchronization of the connection fails to satisfy a synchronization threshold or an associated constraint.

Aspect 24: The method of aspect 23, further comprising: transmitting, to the network node, a message indicating the synchronization timer has expired.

Aspect 25: The method of any of aspects 23 through 24, further comprising: reporting a resetting of the synchronization timer to the network node.

Aspect 26: The method of aspect 25, further comprising: receiving, from the network node at least in part in response to reporting the resetting of the synchronization timer, an indication that the UE is allowed to communicate with the non-terrestrial network.

Aspect 27: The method of any of aspects 23 through 26, wherein the synchronization timer comprises a media access control timer that indicates a validity of a Doppler frequency offset associated with communication between the UE and the non-terrestrial network and that indicates a validity of a timing advance of a terrestrial network.

Aspect 28: The method of any of aspects 23 through 27, wherein expiration of the synchronization timer comprises expiry of a global navigation satellite system fix associated with the connection, expiry of ephemeris information associated with the connection, expiry of a time synchronization associated with the connection, expiry of a frequency synchronization associated with the connection, or any combination thereof.

Aspect 29: An apparatus for wireless communication at a UE, comprising a processor; memory coupled with the processor; and instructions stored in the memory and executable by the processor to cause the apparatus to perform a method of any of aspects 1 through 22.

Aspect 30: An apparatus for wireless communication at a UE, comprising at least one means for performing a method of any of aspects 1 through 22.

Aspect 31: A non-transitory computer-readable medium storing code for wireless communication at a UE, the code comprising instructions executable by a processor to perform a method of any of aspects 1 through 22.

Aspect 32: An apparatus comprising a processor; memory coupled with the processor; and instructions stored in the memory and executable by the processor to cause the apparatus to perform a method of any of aspects 23 through 28.

Aspect 33: An apparatus comprising at least one means for performing a method of any of aspects 23 through 28.

Aspect 34: A non-transitory computer-readable medium storing code the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    establishing a connection between the UE and a network node of a non-terrestrial network;
    identifying, based at least in part on a synchronization failure event and while the UE is in a connected mode in accordance with establishing the connection, that a location failure condition has occurred for the connection, wherein the synchronization failure event comprises expiry of a synchronization timer associated with a synchronization associated with the connection;
    transmitting, to the network node, a message indicating that the synchronization timer has expired;
    performing, at least in part in response to the location failure condition, one or more actions of a location failure recovery procedure to restore a synchronization associated with the connection; and
    initiating a radio link failure timer based at least in part on performing the location failure recovery procedure and the synchronization timer expiring.

2. The method of claim 1, wherein the synchronization timer indicates at least one of a validity of an uplink frequency synchronization associated with the connection between the UE and the non-terrestrial network, or a validity of a timing advance of the UE associated with the non-terrestrial network.

3. The method of claim 1, further comprising:
    resetting the synchronization timer based at least in part on the UE receiving ephemeris information from the network node of the non-terrestrial network, or the UE acquiring a location of the UE via a global navigation satellite system fix based at least in part on signals received from a plurality of positioning satellites separate from the non-terrestrial network, or both.

4. The method of claim 3, further comprising:
reporting the resetting of the synchronization timer to the network node.

5. The method of claim 4, further comprising:
receiving, from the network node at least in part in response to reporting the resetting of the synchronization timer, an indication that the UE is permitted to communicate with the non-terrestrial network based at least in part on resetting the synchronization timer.

6. The method of claim 1, wherein the message indicating the synchronization timer associated with the synchronization has expired comprise a random access preamble transmission, a scheduling request, a message using a configured grant associated with the connection, a message using semi-persistent scheduling resources associated with the connection, or any combination thereof.

7. The method of claim 1, wherein expiration of the synchronization timer comprises expiry of a global navigation satellite system fix associated with the connection, expiry of ephemeris information associated with the connection, expiry of a time synchronization associated with the connection, expiry of a frequency synchronization associated with the connection, or any combination thereof.

8. The method of claim 1,
wherein the UE declares a radio link failure when the location failure recovery procedure is not completed before the radio link failure timer expires.

9. The method of claim 8, further comprising:
transmitting an indication of the radio link failure to the network node upon initiating the radio link failure based at least in part on the radio link failure timer being set to zero.

10. The method of claim 8, further comprising:
determining, before expiry of the radio link failure timer, that the synchronization associated with the connection is restored or maintained based at least in part on a synchronization recovery event associated with the radio link failure indicating that the synchronization associated with the connection is within a synchronization range; and
transmitting, to the network node based at least in part on the determining that the synchronization associated with the connection is restored or maintained, a message indicating that the synchronization is restored.

11. The method of claim 10, wherein the synchronization recovery event comprises:
determining that the synchronization timer is active, wherein the synchronization timer being active indicates that the synchronization in time, in frequency, or both, is valid, indicates a global navigation satellite system fix associated with determining the location of the UE is valid, indicates ephemeris information associated with the connection is valid, or any combination thereof.

12. The method of claim 1, wherein:
the synchronization timer or aspects of the synchronization timer, or both, are configured by an indication from the non-terrestrial network or configured by the UE, or both; and
the aspects of the synchronization timer comprise at least one of a duration, an initiation, a start time, an expiration time, a resetting, or any combination thereof.

13. The method of claim 1, wherein the location failure condition comprises the UE failing to determine its own location within a first accuracy constraint, the UE failing to determine a location of the network node of the non-terrestrial network within a second accuracy constraint, or both.

14. The method of claim 1, wherein the one or more actions comprise ceasing transmissions to the non-terrestrial network for a threshold time based at least in part on the UE determining that the location failure condition has occurred, or transmitting an indication of a synchronization error to the network node and ceasing transmissions to the non-terrestrial network for the threshold time based at least in part on the UE transmitting the indication of the synchronization error.

15. The method of claim 1, wherein the one or more actions comprise prioritizing reading ephemeris information over one or more other operations, or prioritizing acquiring a global navigation satellite system fix over the one or more other operations, or both, wherein the one or more other operations comprise transmitting an uplink communication to the network node of the non-terrestrial network, or receiving a downlink communication from the network node of the non-terrestrial network, or both.

16. The method of claim 1, wherein the one or more actions comprise:
transmitting, to the network node, a random access preamble that comprises at least one aspect or identifier dedicated to indicating the location failure condition associated with the non-terrestrial network;
receiving a response to the random access preamble, wherein the response comprises a closed-loop fix that indicates a degree to which the synchronization associated with the connection is outside of a synchronization range; and
adjusting the synchronization according to the closed-loop fix.

17. The method of claim 1, wherein the one or more actions comprise initiating a radio link failure, declaring the radio link failure to the network node, or both, based at least in part on identifying the location failure condition.

18. The method of claim 1, wherein the synchronization failure event comprises:
receiving a message from the network node that indicates the synchronization associated with the connection is outside of a synchronization range, determining that a measurement indicates the synchronization associated with the connection is outside of the synchronization range, determining an error in a message associated with the non-terrestrial network indicates that the synchronization associated with the connection is outside of the synchronization range, or any combination thereof.

19. The method of claim 1, wherein the synchronization associated with the connection established between the UE and the non-terrestrial network comprises a time synchronization associated with time-based communication between the UE and the non-terrestrial network, a frequency synchronization associated with frequency-based communication between the UE and the non-terrestrial network, or both.

20. The method of claim 1, wherein the UE comprises a narrowband internet of things (NB-IoT) device, or an enhanced machine type communication (eMTC) device, or a combination thereof.

21. A method for wireless communication at a user equipment (UE) comprising:

transmitting, in a connected mode for a connection between the UE and a network node of a non-terrestrial network, one or more uplink messages to the network node;
identifying, while the UE is in the connected mode, that a synchronization timer associated with a synchronization of the connection has expired;
transmitting, to the network node, a message indicating that the synchronization timer has expired;
determining, based at least in part on the expiration of the synchronization timer, that the synchronization of the connection fails to satisfy a synchronization threshold or an associated constraint; and
initiating a radio link failure timer based at least in part on performing a location failure recovery procedure and the synchronization timer expiring.

22. The method of claim 21, further comprising:
reporting a resetting of the synchronization timer to the network node.

23. The method of claim 22, further comprising:
receiving, from the network node at least in part in response to reporting the resetting of the synchronization timer, an indication that the UE is allowed to communicate with the non-terrestrial network.

24. The method of claim 21, wherein the synchronization timer comprises a media access control timer that indicates a validity of a Doppler frequency offset associated with communication between the UE and the non-terrestrial network and that indicates a validity of a timing advance of a terrestrial network.

25. The method of claim 21, wherein expiration of the synchronization timer comprises expiry of a global navigation satellite system fix associated with the connection, expiry of ephemeris information associated with the connection, expiry of a time synchronization associated with the connection, expiry of a frequency synchronization associated with the connection, or any combination thereof.

26. An apparatus for wireless communication at a user equipment (UE), comprising:
a processor;
memory coupled with the processor; and
instructions stored in the memory and executable by the processor to cause the apparatus to:
establish a connection between the UE and a network node of a non-terrestrial network;
identify, based at least in part on a synchronization failure event and while the UE is in a connected mode in accordance with establishing the connection, that a location failure condition has occurred for the connection, wherein the synchronization failure event comprises expiry of a synchronization timer associated with a synchronization associated with the connection;
transmit, to the network node, a message indicating that the synchronization timer has expired;
perform, at least in part in response to the location failure condition, one or more actions of a location failure recovery procedure to restore a synchronization associated with the connection; and
initiate a radio link failure timer based at least in part on performing the location failure recovery procedure and the synchronization timer expiring.

27. An apparatus for wireless communication at a user equipment (UE), comprising:
a processor;
memory coupled with the processor; and
instructions stored in the memory and executable by the processor to cause the apparatus to:
transmit, in a connected mode for a connection between the UE and a network node of a non-terrestrial network, one or more uplink messages to the network node;
identify, while the UE is in the connected mode, that a synchronization timer associated with a synchronization of the connection has expired;
transmit, to the network node, a message indicating that the synchronization timer has expired;
determine, based at least in part on the expiration of the synchronization timer, that the synchronization of the connection fails to satisfy a synchronization threshold or an associated constraint; and
initiate a radio link failure timer based at least in part on performing a location failure recovery procedure and the synchronization timer expiring.

* * * * *